(12) United States Patent
Olden et al.

(10) Patent No.: US 7,491,941 B2
(45) Date of Patent: Feb. 17, 2009

(54) SCANNING FOCAL POINT APPARATUS

(75) Inventors: Timothy Hanson Olden, Nashua, NH (US); Dale John Martin, Lunenburg, MA (US); Thomas Christopher John Sefranek, Shirley, MA (US); Gordon Allan LaPoint, Leominster, MA (US); Hugh Adam Stoddart, Harvard, MA (US); Hugh Franklin Stoddart, Groton, MA (US)

(73) Assignee: Neurophysics Corporation, Shirley, MA (US)

( * ) Notice: Subject to any disclaimer, the term of this patent is extended or adjusted under 35 U.S.C. 154(b) by 159 days.

(21) Appl. No.: 11/196,945

(22) Filed: Aug. 4, 2005

(65) Prior Publication Data

US 2007/0029491 A1   Feb. 8, 2007

(51) Int. Cl.
   *G21K 1/02* (2006.01)
(52) U.S. Cl. .................................................. 250/363.1
(58) Field of Classification Search .............. 250/363.1, 250/370.08
   See application file for complete search history.

(56) References Cited

U.S. PATENT DOCUMENTS

| | | | | |
|---|---|---|---|---|
| 4,181,839 A * | 1/1980 | Hatton et al. | | 378/148 |
| 4,203,034 A * | 5/1980 | Carroll, Jr. | | 378/85 |
| 4,209,700 A | 6/1980 | Stoddart | | |
| 4,288,697 A * | 9/1981 | Albert | | 250/505.1 |
| 5,436,958 A * | 7/1995 | Taylor | | 378/149 |
| 6,181,764 B1 * | 1/2001 | Solomon et al. | | 378/4 |
| 6,353,227 B1 * | 3/2002 | Boxen | | 250/363.1 |
| 2003/0001098 A1 * | 1/2003 | Stoddart et al. | | 250/363.04 |
| 2005/0084072 A1 * | 4/2005 | Pinchot | | 378/154 |

OTHER PUBLICATIONS

W.S. Choong, el al., Design for a High-resolution Small-Animal SPECT System Using Pixellated Si(Li) Detectors for In Vivo 125I imaging, Manuscript received Nov. 15, 2003, Berkeley, CA.

R.D. Hichwa el al., Initial Performance Measurements and Nude Mouse Imaging with Phillips Mosaic Small Animal Pet Scanner, Annual Meeting of the Society of Nuclear Medicine, Jun. 19-23, 2004, Philadelphia, PA.

C. Kak and Malcolm Slaney, Principles of Computerized Tomographic Imaging, 1988 by the IEEE Press.

* cited by examiner

*Primary Examiner*—David P Porta
*Assistant Examiner*—Carolyn Igyarto
(74) *Attorney, Agent, or Firm*—Daniels Patent Law, PLLC; Scott A. Daniels

(57) ABSTRACT

A collimator, and in particular a method for making a collimator for use with a small high resolution single-photon emission computed tomographic (SPECT) imaging tool for small animal research. The collimator is sized, both functionally and structurally, particularly smaller than known collimators and appropriately scaled to achieve a highly sensitive collimator which facilitates desired reconstruction resolutions for small animals, as well as compliments other functional imaging modalities such as positron emission tomography (PET), functional magnetic resonance imaging (fMRI), electroencephalography (EEG), and event-related potential (ERP), magneto-encephalography (MEG), and near-infrared optical imaging.

5 Claims, 20 Drawing Sheets

SCANNING FOCAL POINT APPARATUS

FIELD OF THE INVENTION

The present invention relates to a collimator, and in particular a method for making a collimator for use with a small, high resolution single-photon emission computed tomographic (SPECT) imaging tool for small animal research. More particularly, the collimator is sized, both functionally and structurally, particularly smaller than known collimators and appropriately scaled to achieve a highly sensitive collimator which facilitates desired reconstruction resolutions for small animals, as well as compliments other functional imaging modalities such as positron emission tomography (PET), functional magnetic resonance imaging (fMRI), electroencephalography (EEG), and event-related potential (ERP), magneto-encephalography (MEG), and near-infrared optical imaging.

BACKGROUND OF THE INVENTION

In the last quarter century, the use of brain imaging for the treatment and understanding of diseases and genetic flaws has grown dramatically following the introduction of Computerized Tomographic X-Ray (CT) in 1972 followed in 1982 by magnetic resonance imaging (MRI). The reason for this growth and importance in brain imaging is that neurologists, psychiatrists and neuroscientists utilize and attach substantial importance to high resolution, three-dimensional, anatomical images of the brain. The development of functional brain imaging which seeks to map the distribution of brain activity has closely followed the development of structural imaging which maps some physical property of the brain such as tissue density.

While SPECT is playing an important role in functional brain imaging, it has been limited in many applications by its low spatial resolution. The tiny structures of the brain where thinking and other neuronal activity takes place are much smaller than the resolution of the best SPECT scanners and, therefore, are not seen. This situation is even further complicated where brain imaging is performed on a small animal such as a rat or mouse. The brain structures of such animals are much smaller than a human brain structure and, therefore, the resolution of conventional SPECT scanners is grossly inadequate.

In general, the typical clinical resolution of the best SPECT rotating gamma-cameras as well as PET and functional MRI, is about 9, 7 and 3 mm, respectively. One area of improvement used to bring rotating gamma-cameras to their state-of-the-art is modifying the original parallel hole collimator design to the higher performance mildly converging tapered hole designs while increasing camera size in order to maintain a sufficiently large field-of-view.

In recent years, small animal imaging has been the subject of intense research and development. This is largely due to the advances in molecular and cell biology, the use of transgenic mice models and the availability of new imaging tracers. The genetic similarity of mice to humans has enabled a wide range of human diseases to be studied in animal models. The completion of the sequence of the human genome will improve our understanding of human biology at the molecular level and create new and improved models of human diseases. Transgenic mice have been widely used in the study of cancer mechanisms and from modeling human diseases.

Recently, the study of transgenic mice has opened new prospects in evaluating human gene therapy by non-invasive, repetitive and quantitative imaging of gene expression. It is of interest in drug discovery and development to map the concentration of experimental, bioactive molecules in the body of a mouse or other laboratory animal. This is typically done by tagging the molecules with a gamma-ray emitting atom (radioisotope) and then externally scanning the animal with directionally sensitive gamma ray detectors. This modality, as discussed above, is called "SPECT" (Single Photon Emission Computed Tomography).

For example, animals injected with molecules tagged with radioisotopes, for example, a neurotransmitter such as dopomine, may be tagged with, among others, low energy photon emitting I-125 which may be desirable because it has a half-life of almost 60 days, is readily available and also has sufficient energy of the low energy photon to escape from the tissue of the animal.

The emitted gamma rays are generally collected by devices known as collimators. Collimators are traditionally blocks of lead with holes drilled or cast in them. The holes permit gamma rays, which are traveling in a specific direction, to pass through the holes in the blocks or, in other words, the holes in the collimator specify the flight direction of gamma rays received from a single photon emission radio-nuclide. Any gamma rays not passing through the hole(s) are blocked, i.e., absorbed, by the lead structure of the collimator. The longer or narrower the holes, the more precise or specific the direction, i.e., the flight path of the gamma ray can be determined. This is good for geometrical, spatial resolution, i.e., better for determining where the emitted gamma ray came from, but bad for sensitivity. It is bad for sensitivity because the longer and narrower the hole(s) the fewer gamma rays will pass through the hole to impact on the scintillation crystal.

The basic structure of the collimator is thus a hole with a finite length and aperture size. The photons, which pass through an individual hole, are not only photons entering a hole parallel to the hole axis, but also photons entering the hole at a small angle to the hole axis. As a result, each hole accepts all of the photons in a cone at a small vertex angle. This is the reason why the spatial resolution of the collimator is a function of the distance between a source emitting the photons and the collimator surface.

It is known in the field to fabricate a focusing collimator as a thick block or sheet of gamma-ray absorbing material (such as lead) that has a plurality of holes through it. All holes point to the same place in space, the focal point, in front of the collimator. Thus, in the thick sheet the holes must be angled relative to a central axis of the collimator, in order to be aimed at the focal point. In the Applicant's full size human brain SPECT scanner, the collimator is made of lead that is 4 inches thick. The focal point lies 6 Inches in front of the collimator. In other words, if you place your eye at the focal point and look towards the collimator, you will see through all holes at once. A gamma-ray sensitive crystal, also known as a scintillator, is placed behind the collimator and will register far more gamma rays, i.e., obtain more counts, when the source is located at the focal point than if it is located anywhere else.

Focusing collimators having tapered holes are vastly superior than straight, parallel holes as typically used in gamma cameras in that they provide both better geometrical resolution and sensitivity at the same time. However, manufacturing a collimator small enough for adequate precision in both geometrical resolution and sensitivity for small animals is very difficult, inefficient and expensive using machined or cast lead blocks.

The collimator, whether in a reduced size for small animals or sized for use with a human, is merely one part of the entire scanning machine. In either machine, the collimators are arranged in a substantially circular fashion about a longitudinal axis of a source, either human or animal, to obtain a 3-D convolution of the brain. The brain scanner mechanically moves the focusing collimators, i.e., the focal points of the focusing collimators, in such a way that they uniformly sample a single transaxial plane of the human or animal, i.e., a transaxial slice normal to a longitudinal head to toe axis of the human, at one time. In order to do this, the collimators are moved by a supporting gantry in such a way that they simultaneously translate across the slice in one direction. When a line is completed, the collimators increment out (or in) and then translate across the slice in the opposite direction.

The process is repeated until a raster scan of the slice is completed by all collimators. The brain scanner scans a transaxial slice 200 mm in diameter (field of view) and produces images with a resolution of about 2.5 mm. This is known as scanning focal point technology and it is unique in nuclear medicine. The total volume of the brain is sampled by incrementally stepping the bed carrying the human patient or animal axially at the completion of each slice. A more detailed description of the collimator travel and scan movement is discussed and known from Stoddart, U.S. Pat. No. 4,209,700 and, therefore, a further detailed discussion of the same is hereby incorporated by reference.

SUMMARY OF THE INVENTION

The object of the present invention is to provide a collimator small enough for use on a SPECT machine accommodating small animals while maximizing spatial resolution and sensitivity to provide for adequate data collection.

It is another object of the invention to appropriately scale the reduced size collimator putting at least the same number of holes used in a full size human collimator in the smaller animal collimator.

It is a still further object of the present invention to manufacture the reduced size collimator to a size of about ¼ the size of the human collimator and appropriately scale the holes and the septa formed in the collimator to achieve a field of view of about 50 mm relative to the approximately 200 mm field of view of the full size collimator.

Another object of the present invention is to provide a collimator which can be easily manufactured to a small size by the use of chemical etching techniques to fabricate a plurality of plates having respective gamma ray passage holes formed therein.

Another object of the invention is to provide an appropriately scaled gamma ray that will be absorbed by the correspondingly thinner septa of the reduced size small animal collimator.

To obtain an adequate resolution and sensitivity, if the entire small animal scanner were reduced to about ¼ the size of the existing full size human brain scanner, the field of view would be 50 mm and (since the size of the focal point also scales) the point-source resolution would be about 625 microns. Reducing the dimensions of everything (mechanics, photomultiplier tubes, scintillating crystals, etc.) by four does not present any significant problem. The exception is the collimators, which would have to be reduced from 4 inches to 1 inch thickness. More importantly, the septa (material thickness between holes that define the holes) would be decreased from 0.4 mm to 0.1 mm. The gamma rays would then cross the septa and the collimator would no longer define a focus. In other words, if the gamma ray energy is not scaled, such a collimator would become mostly "transparent". In addition, the scaled hole sizes would become so small that they could no longer be made by casting as is the case with the brain scanner collimators.

To overcome the manufacturing and scaling issues presented by the reduced size collimator, the present invention utilizes a collimator made from a plurality of chemically etched stacked plates. Each plate of the collimator has the same array of holes. The holes may be, but do not have to be the exact same size, for example due to the inclination of passages farther out from the center the holes defining these outer passages may be larger, than those closer in. The holes from plate to plate vary slightly in both size and radial location to the center of the plate. When stacked, the holes of adjacently stacked plates align such that there are a plurality of adjacent tapering passages extending through the collimator from a top plate defined by the plate having the largest holes formed therein on the top of the collimator to a bottom plate defined by the plate having the smallest holes on the bottom of the collimator. By stacking the chemically etched plates, the precision benefits of using many collimator holes are gained without the increased cost of manufacturing a collimator small enough to obtain sufficient resolution in small animals using the previously known methods. It is to be appreciated that holes may be made by other methods other than by chemically etching.

In order to simplify and reduce the cost, the number of detectors in the small animal scanning machine have been reduced from twelve to eight, each subtending an angle of about 45 degrees in the transaxial slice and about 67 degrees in the axial direction. The product of the angle subtended in the transaxial plane by each collimator times the number of collimators should be approximately 360 degrees in order to fully sample all angles.

BRIEF DESCRIPTION OF THE DRAWINGS

The invention will now be described, by way of example, with reference to the accompanying drawings in which.

DETAILED DESCRIPTION OF THE INVENTION

Figure 1:
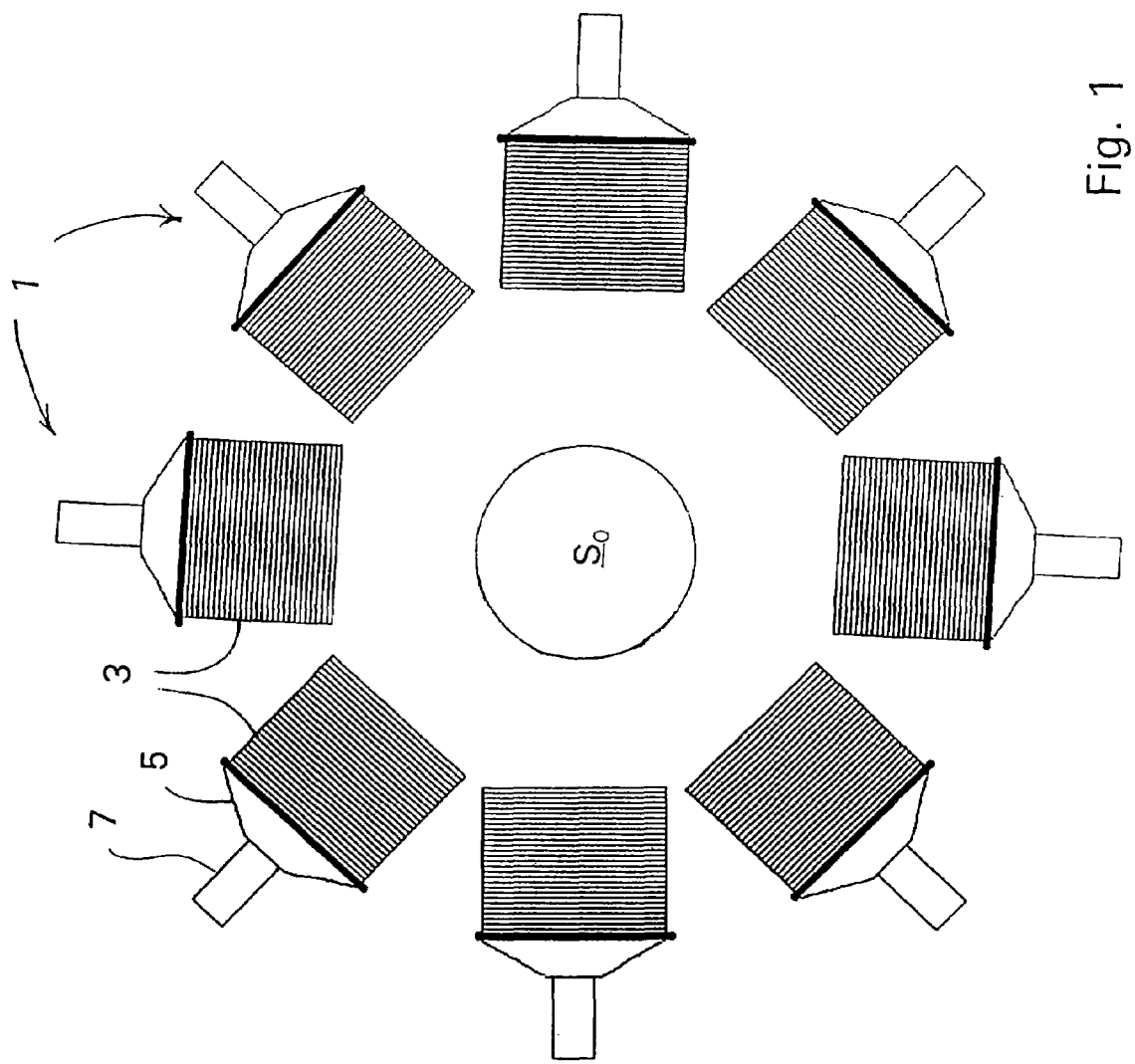
FIG. 1 is a schematic of a system of eight collimators for obtaining a transaxial slice of a small rodent.

Observing FIG. 1, the present invention involves a scanning device akin to a scanning microscope. It uses eight identical scanning elements 1, each consisting of a three-dimensional (3D) point focused collimators 3 mated to one or more scintillating crystals 5 each associated with a photomultiplier tube 7. An acquisition or "scan" of a source $S_O$ is nothing more than the 3D convolution described above of the source distribution of injected radionuclide with each detector's point-spread function (PSE). Although the present invention employs an iterative reconstruction to deal with absorption, scattering and other complications, a simple multi-detector, windowed, 3D deconvolution works quite well. As with any scanning system, intrinsic resolution and sensitivity are completely characterized by the point-spread functions of the detectors.

Figure 2:
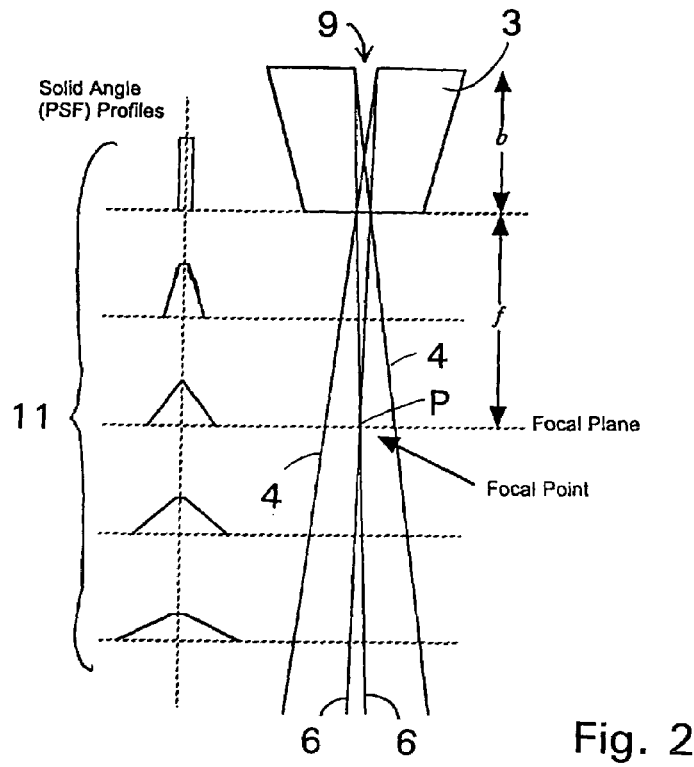
FIG. 2 is a single tapered-hole collimator point-spread function distribution.

Turning to FIG. 2, to derive the PSF, first consider a detector whose collimator 3 consists of a single tapered hole 9 of bore length b and focal length f. Its PSF at any point in space is proportional to the apparent solid angle subtended by the hole 9 from the vantage of that point.

Clearly, for all points lying outside lines 4, which are the most extreme rays to pass through, the hole's apparent solid angle is zero; only within the lines 4 are the PSF non-zero. Moving horizontally (keeping distance from the face of the collimator fixed), solid angle plotted against position will describe a triangle between the lines 4 with a flat top in the region between lines 6. This PSF 11 is accordingly illustrated on the left side of FIG. 2 for five source-collimator distances.

The actual collimator 3 consists of many such holes around 10,000 in the disclosed embodiment, much smaller than the one shown in FIG. 2, oriented so that all their focal points intersect at a common point P on the focal plane.

To facilitate understanding of the scanner, we will temporarily assume, at least within the volume being scanned, that each hole PSF 11 has constant profile rather than fanning out with distance (a reasonable choice for this is the focal plane profile). Furthermore, assume all hole PSFs have identical shape and size, but vary in orientation according to the orientation of their corresponding holes.

Figure 3:
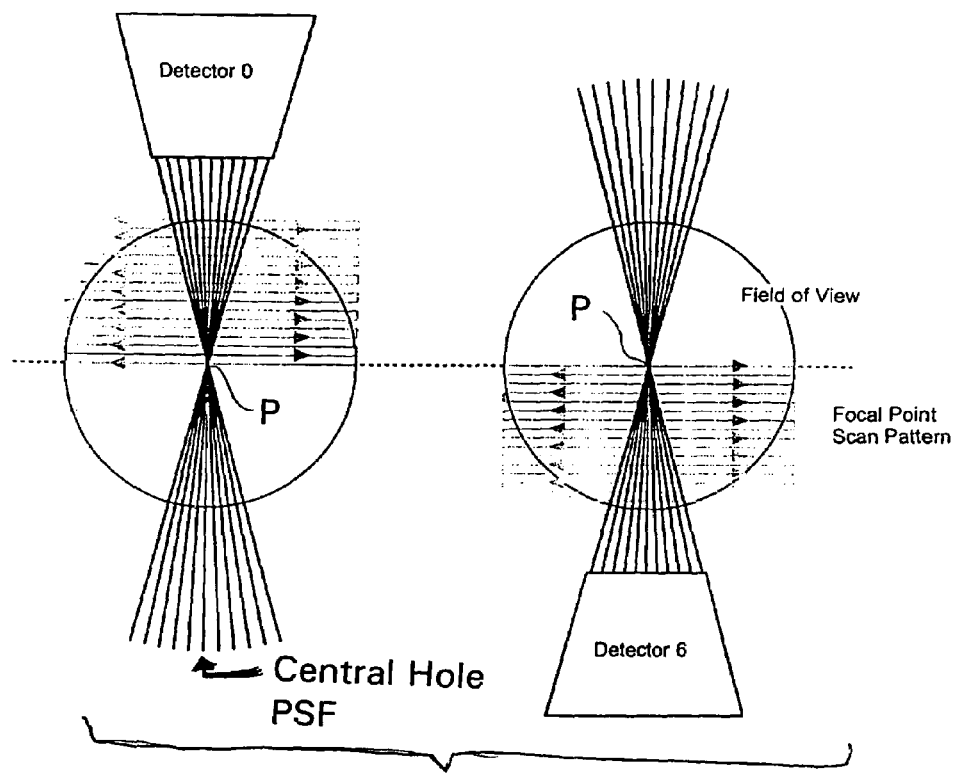
FIG. 3 is a pair of multiple tapered-hole collimators each scanning half of the field of view.

By superposition, the full collimator PSF is the sum over all individual hole PSFs. This is represented in FIG. 3 at left as a bundle of lines (projections) where each line represents the PSF of one hole 9. In practice, each detector only scans half the field-of-view. An opposing detector having the same PSF, as diagrammatically shown in FIG. 3, completes the scan.

Figure 4:
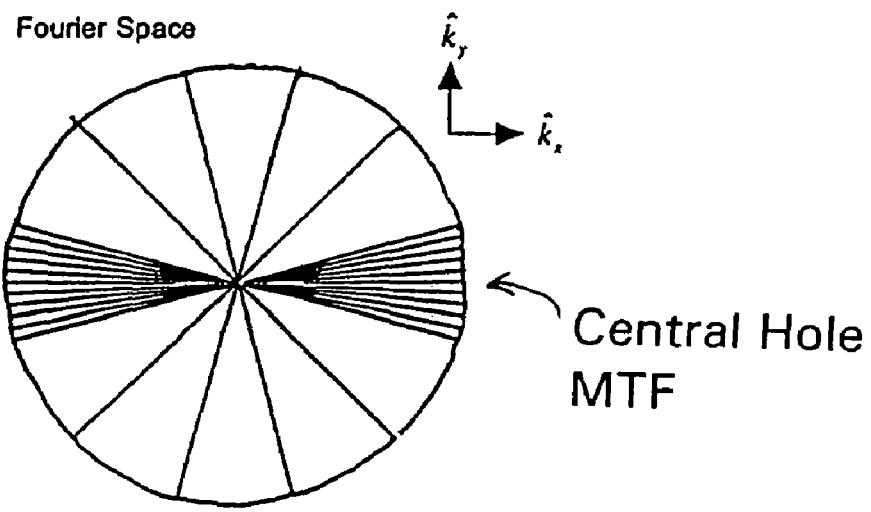
FIG. 4 is a Fourier Transform of point-spread function distributions in Fourier space.

To understand what information is provided by such a scan, it is instructive to consider the spatial frequency response of this two-detector system. Noting that the Fourier Transform of a sum of PSFs is the same as the sum of each PSF's Fourier Transform, we start by looking at the central hole's PSF marked on FIG. 3. Its Fourier Transform (MTF) is depicted by the horizontal line in Fourier space drawn in FIG. 4. It has infinitesimal extent along $k_y$ and finite extend along $k_x$. The measure of that extent is, by the nature of Fourier Transform pairs, the reciprocal of the PSF's width. Keeping in mind that the MTFs of the other holes are the same as this one, each with its own orientation, a sum over all of the holes produces the complete collimator-pair MTF shown here as a bundle of lines of varying orientation, all passing through the origin. The bundle fills opposing wedges subtending 30 degrees, the same as the angular span of the complete collimator-pair PSF, shown in FIG. 3. When all four pairs of collimators are included, generally shown in FIG. 1, the remaining wedges are filled and all spatial frequencies are known out to the radius set by the reciprocal of the single-hole PSF width.

In three dimensions, each hole's MTF becomes a plane of finite extent perpendicular to the hole's axis. As in two dimensions, the complete MTF is the sum over all such planes. This is difficult to picture, but note that in the limit where the bundle of PSFs cover a full $4\pi$ of solid angle, such as would be the case of a single spherical collimator surrounding the source, the complete PSF has a $1/r^2$ dependence and its corresponding MTF has a $1/k$ dependence.

The fundamental difference to note is that while the rotating gamma camera treats its field-of-view as a stack of slices to be sampled independently using a two-dimensional PSF with a $1/r$ dependence, the small animal camera treats its field-of-view as a volume to be sampled by a three-dimensional PSF with an approximate $1/r^2$ dependence.

Resolution and Sensitivity

As in FIG. 2, the profile of apparent solid angle $\Omega$ has the shape of a flat-topped triangle. By simple geometrical consideration, its full width at half maximum $\Delta$ a distance s from the face of the collimator 3 is found to be $$\Delta(s) = \begin{cases} \left(1 + \frac{2}{b}\right)w & s \leq f \\ \left(\frac{s}{f} + \frac{2}{b}\right)w & s \geq f \end{cases} \tag{1}$$

Where w is the width of the hole 9 on the face of the collimator 3, b is its bore length and f is its focal length. Its peak value is $$\Omega_0(s) \approx \begin{cases} \dfrac{(1+b/f)^2}{(1+b/s)^2} \dfrac{a}{s^2} & s \leq f \\ \dfrac{a}{s^2} & s \geq f \end{cases} \tag{2}$$

where a is the cross-sectional area of the hole 9. For square holes 9, $a=w^2$ and $\Omega$ is a flat-topped pyramid whose full width at half maximum along both axes is given by (1). For circular holes 9, $a=(\pi/4)w^2$ and $\Omega$ is a flat-topped cone whose full diameter at half maximum is also given by (1).

The standard measure of collimator sensitivity is the fraction of photons emitted by a small isotropic source positioned in front of the collimator that are accepted by the collimator. This does not work for the focused collimator because that fraction depends radically on source size and location. Instead, define hole sensitivity $S_h$ as the count rate one would obtain if a sheet of activity emitting one gamma-ray per unit time per unit area were placed in front of and normal to the hole 9. Then, by definition $$S_h = \frac{1}{4\pi} \int\!\!\int_{sheet} \Omega(x, y) dx dy$$

which, for square holes 9, is just the product $$S_h = \frac{\Omega_0}{4\pi} \Delta^2$$

According to (1) and (2), hole sensitivity is $$S_h = \frac{a^2}{4\pi}\left(\frac{1}{b} + \frac{1}{f}\right)^2 \quad (3)$$

and, as demanded by conservation of flux, is independent of s. Finally, total collimator sensitivity is obtained by summing over all holes 9.

Pinhole Camera Comparison

Figure 5:
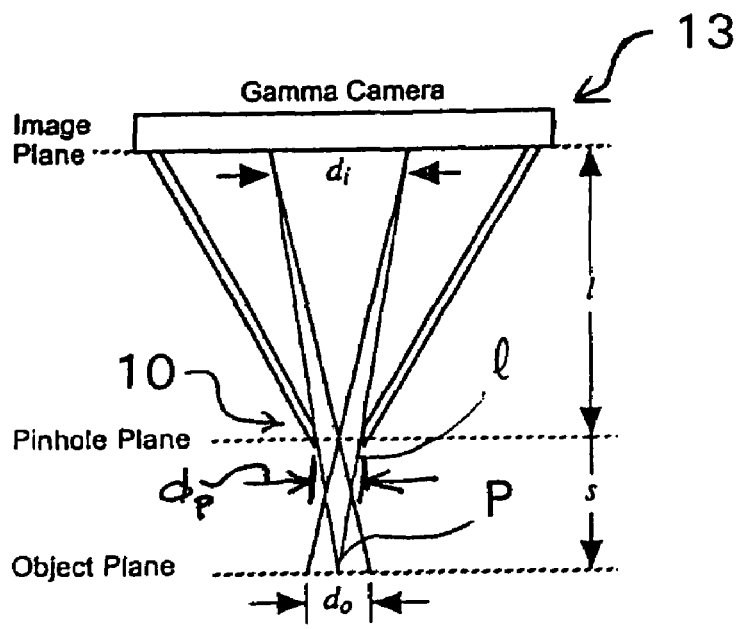
FIG. 5 is a pinhole camera showing the focal depth capacity.

As seen in FIG. 5, a pinhole camera 13 consists of a small hole of diameter $d_p$ located a distance $l$ from a gamma camera. Magnification M, defined as the ratio of image size to object size, is given by $$M(s) = \frac{l}{s} \quad (4)$$

an inverse function of the distance s from the pinhole plane to the object plane.

As shown by lines 1 on FIG. 5, a point source P located anywhere on the object plane will illuminate a disk on the image plane of diameter $d_i = ((s+l)/s)d_p$. Since two point sources on the object plane a distance $d_0$ apart are just fully resolved when $Md_0 = d_i$, the resolution of the camera at s is characterized by a disk of diameter $$d_0(s) = \left(1 + \frac{s}{l}\right)d_p = \left(1 + \frac{1}{M(s)}\right)d_p \quad (5)$$

Ignoring the reduction in sensitivity which occurs near the edges of the camera, apparent solid angle has the $1/s^2$ dependence $$\Omega(s) \approx \frac{\pi}{4}\left(\frac{d_p}{s}\right)^2 \quad (6)$$

The total count rate due to a sheet of activity on the object plane emitting one gamma-ray per unit time per unit area is just the product of the field-of-view (FOV) on the object plane with $\Omega/4\pi$. Denoting the area of the camera by $A_{PC}$, we have FOV=$A_{PC}/M^2$, hence a full sensitivity of $$S_{PC} = \frac{A_{PC}}{16}\left(\frac{d_p}{l}\right)^2 \quad (7)$$

which, as expected again, is independent of s.

By comparison, full sensitivity $S_{NF}$ for the present invention is $NS_h$ where N is the total number of holes 9 and $S_h$ is the previously sensitivity per hole. Since one can pack into an area A of collimator $A/(w+t)^2$ square holes 10 of size w with septal thickness t, we find using (3)

$$S_{NF} = \frac{A_{NF}}{4\pi} \frac{w^2}{(w+t)^2}\left(\frac{1}{b} + \frac{1}{f}\right)^2 w^2 \quad (8)$$

where $A_{NF}$ is the combined front surface area of all eight collimators 3.

To compare the performance of the two systems, let us suppose the design goal is to image a cylindrical source of diameter D at a resolution of D/50. An appropriate system with a minimum clearance between collimator 3 and cylinder 15 of D/4 would have the following dimensions:

| | |
|---|---|
| focal length: | f = (3/4)D |
| bore length: | b = (3/4)D |
| collimator area: | $A_{NF}$ = 3D² (12 collimators, each subtending 30° × 45° at f) |
| septal thickness: | t = 0.25 mm (for I¹²³ and lower energy emitters) |
| hole size: | w = D/100 (according to (1), this obtains desired resolution at s = f) |

To obtain identical performance from a pinhole based system capable of imaging the same cylinder 15 at the same resolution and sensitivity requires $S_{PC}=S_{NF}$ and $d_0(D)=D/50$.

First consider sensitivity. A pinhole camera 13 of θ=60° angular FOV will just accommodate a cylinder 15 of diameter D when the distance from pinhole to center of cylinder 15 is D. This is illustrated in FIG. 5. Furthermore, the area of the camera $A_{PC}$ is set by θ and l which, for θ=60°, is given by $(4/3)l^2$. Using these relationships, (7) becomes, $$S_{PC} = \frac{N}{12}d_p^2 \quad (9)$$

where the factor N is included to allow for the possibility of an N-headed system. This implies sensitivity is determined solely by the total area of all N pinholes.

Now consider resolution. A remarkable feature of the focused scanning system is that there is no loss in resolution due to an inability to precisely locate where on the detector a gamma ray hits. That information is irrelevant. One only has to know where in the scan pattern the camera is when the hit occurs. The pinhole camera 13 must be able to determine where each gamma ray enters and be able to do so over a ±30° range in angle of incidence. To do this precisely requires the use of pixilated crystals and a detector array. Assuming such an arrangement can determine, without error, which crystal pixel a gamma-ray enters, and each pixel is ϵ×ϵ in size, the effective resolution diameter on the object plane is increased by about ϵ/M. Taking this into account, (5) becomes $$d_p(s) = d_p + \frac{1}{M(s)}(d_p + \varepsilon) \qquad (10)$$

For a given $d_p$ and ϵ, this determines the magnification needed to achieve a given resolution at s.

Figure 7:
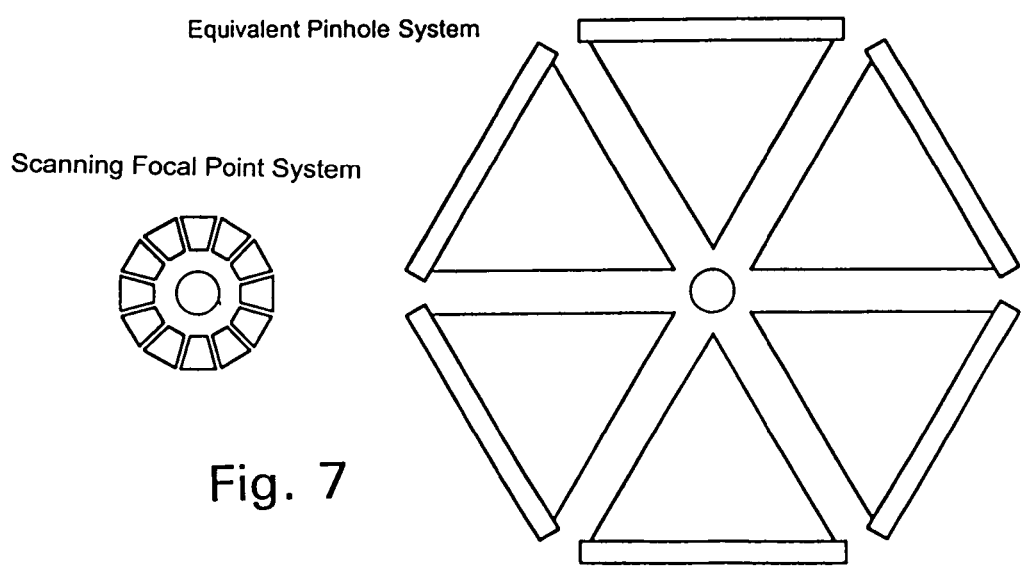
FIG. 7 is a size of the scanning focal point system compared to the equivalent Pinhole Camera System.

To proceed further, we must choose a specific D. For D=50 mm, we obtain $S_{NF}$=0.189 mm². According to (9), setting $S_{PC}$=0.189 mm² and N=2 gives a pinhole diameter of 1.07 mm. However, no value of M in (10) will obtain a resolution of 1 mm for $d_p$=1.07 mm. More heads are required. In fact, total camera area is minimized by going to six heads. In this configuration, we find $d_p$=0.615 mm gives the required sensitivity and, for ϵ=1.2 mm, the magnification needed to achieve 1 mm resolution at the center of the cylinder 15 is 4.71. To get an idea of the relative size of the two equivalent systems, we have drawn them to scale in FIG. 7.

Each detector of the pinhole system requires a 740 cm² pixilated crystal and an array of precision position sensitive detectors. The detector of the present embodiment requires only a single 25 cm² crystal and one non-position sensitive detector. Furthermore, the invention works just as well on energetic gamma-ray sources such as I-123 and Tc-99m as it does on I-125 due to the fact that crystal thickness is irrelevant to resolution. The necessarily small size of pixilated crystals precludes their effective use with any commonly used isotope other than $I^{125}$ because, at a 30 degree angle of incidence, the average path length through a crystal element is only the width of the element itself.

Figure 6:
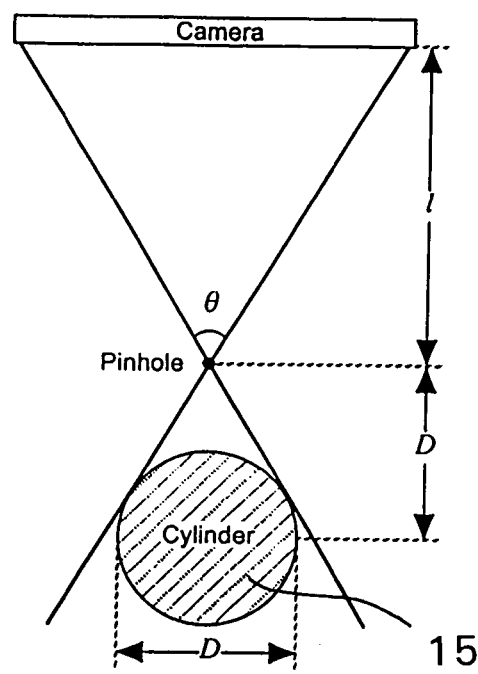
FIG. 6 is a pinhole camera showing the angular capacity.

If we ignore collimator septal thickness and pinhole camera 13 intrinsic resolution, the expressions we have derived for sensitivity and resolution scale linearly with system size. That is, FIGS. 6 and 7 accurately depict the relative size of equivalent systems at most any scale.

Current efforts in pinhole camera 13 design concentrate on the imaging of mice which fit into a 25 mm diameter cylinder 15. Existing systems obtain 1-2 mm resolution with sensitivities of a few counts/sec/mCi⁵. By comparison, resolution of the invention with a 25 mm diameter FOV is, by design, D/50=0.5 mm, corresponding to a hole 9 size of D/100=0.25 mm. To compare sensitivity, we can't just put a 1 mCi source at the focus of a collimator—it must be distributed over a sheet whose width is that of the cylinder's diameter D and whose height is that spanned by the angular FOV of the pinhole camera 13 measured along the axis of the cylinder 15, also D. Thus, sheet density is 1.60 μCi/mm² and the product of this with $S_{NF}$ as defined by (8) yields 1.570 counts/sec/mCi.

The fact that at more than double the resolution, sensitivity is still three orders of magnitude greater than the pinhole camera 13 is not particularly surprising if you consider that, for the pinhole camera 13, all rays must pass through a real pinhole located well outside the source whereas, for the scanner, all rays pass through a virtual pinhole located within the source itself.

Turning to the physical construction of the collimator itself, one of the issues associated with manufacturing the collimator is not merely the formation of the holes or passages in the block, but also in the accurate formation of the septa (material thickness between holes that define the holes) defining the passageways. The septa thickness and accuracy is important because of the necessity to absorb the gamma rays which impact thereon. The thinning of the septa to make the small animal collimator created an issue beyond that of merely accurately forming the septa.

To reduce the dimensions of the known brain scanner (mechanics, photomultiplier tubes, scintillating crystals, etc.) by four presents a significant problem in the collimators. The collimators would have to be reduced from about 4 inches in the human version, to 1 inch thickness for the small animal machine. The septa would be scaled down from 0.4 mm to 0.1 mm. At this thickness, the gamma rays would then cross through the septa and the collimator would no longer define a focus. In other words, because the gamma ray energy was not scaled, such a collimator would become mostly "transparent". In addition, the scaled hole sizes would become so small that they could no longer be made by casting as is the case with the brain scanner collimators. While the human scanner has 800 holes in each of its twelve 30 degrees high-resolution cast lead collimators, the animal scanner with eight 45 degree collimators requires a much larger number of quarter-diameter holes in each. These collimators cannot be made by casting lead. Instead, they must be micro-machined from a suitable metal like copper although other materials with similar or greater density and atomic number may be used as well.

To construct a smaller scale collimator made from a different material like copper, it is thus also necessary to "scale" the gamma ray energy as well as the mechanical parts. As the energy of gamma ray photons decreases, they are more easily absorbed. In order for 0.1 mm septa to be as absorbent as the 0.4 mm septa of the human brain scanner the gamma ray energy must be decreased to a maximum of about 50 keV for copper.

The radioisotopes used in nuclear medicine have been chosen to emit gamma rays of around 150 keV. This is a compromise between high enough energy to survive getting out of the body, and low enough energy to be stopped (detected) by scintillation crystals. Several radioisotopes are in use, but the one preferred for research is I-123. Iodine atoms can be used to tag a variety of biomolecules because they bond chemically like hydrogen. However, I-123 emits a 159 keV gamma ray that is too high for the reduced size animal collimators made from copper.

I-125 emits a 27.5 keV x-ray and is already in wide use for tagging biomolecules for autoradiography applications. Because its half-life is 60 days, it is more available than I-123 which decays quickly (13 hours) after being produced. The 27.3 keV x-ray is still sufficiently energetic to get out of the animal without too much loss and our animal scanner collimator can be manufactured from a material other than lead, for example, photo-etched copper sheets as discussed in further detail below. The long half-life of I-125 can be a disadvantage in some applications. Interestingly, I-123 also emits a 27.3 keV x-ray along with its 159 keV gamma ray and, therefore, it may be possible to image it as well by using its x-ray. The problem would be the interfering effects of the large flux of the penetrating, high-energy, 159 keV gamma ray photons. It may also be possible to use several iodine radioisotopes with half-lives of several days. With a 13-day half-life, 60% of I-126 decays lead to Te x-rays; and with a 4.1 day half-life, 50% of I-124 decays lead to Te x-rays.

Because of the small size and many holes required for the collimators, the source radiation is limited to low energies where these collimators can be effective. Initially the animal scanner is expected to image I-125 tagged markers. I-125 decays to Te-125 by electron capture resulting in the emission of tellurium x-rays centered at about 27.5 keV. However, a series of experiments using a "mock" copper collimator 1 inch thick as described below and in reference to FIGS. 8 and 9 indicate very encouraging results for the use of I-123.

It is possible to image I-123 using the emission of tellurium x-rays. The decay of 13.27 hour I-123 is also by electron capture to several energy levels in Te-123. The major one (97%) is a 0.2 ns metastable level at 159 keV. The nucleus gets rid of this excess electromagnetic energy by emitting a 159 keV gamma ray (87%) or transferring it directly to an orbital electron by internal conversion (13%). Electron capture and internal conversion both leave vacancies in the tellurium K-shell and copious x-rays are emitted as it refills.

The decay of 13.27 hour I-123 is by electron capture to several energy levels in Te-123. The major one (97%) is a 0.2 ns metastable level at 159 keV. The nucleus gets rid of this excess electromagnetic energy by emitting a 159 keV gamma ray (87%) or transferring it directly to an orbital electron by internal conversion (13%). The ground state Te-123 is also radioactive decaying to Sb-123 with a half-life of $10^{12}$ years.

Electron capture and internal conversion both leave vacancies in the tellurium K-shell and copious x-rays are emitted as it refills. The ones with the greatest abundance are listed below along with those from I-125. The higher fraction of internal conversion electrons is what gives I-125 higher x-ray yields.

|  | keV | I-123 % | I-125 % |
|---|---|---|---|
| Te K$\alpha$2 | 27.202 | 25.00 | 40.60 |
| Te K$\alpha$1 | 27.472 | 46.60 | 75.70 |
| Te K$\beta$3 | 30.944 | 4.21 | 6.83 |
| Te K$\beta$1 | 30.995 | 8. | 13.20 |
| Te K$\beta$2 | 31.704 | 2.35 | 3.81 |

Figure 8:
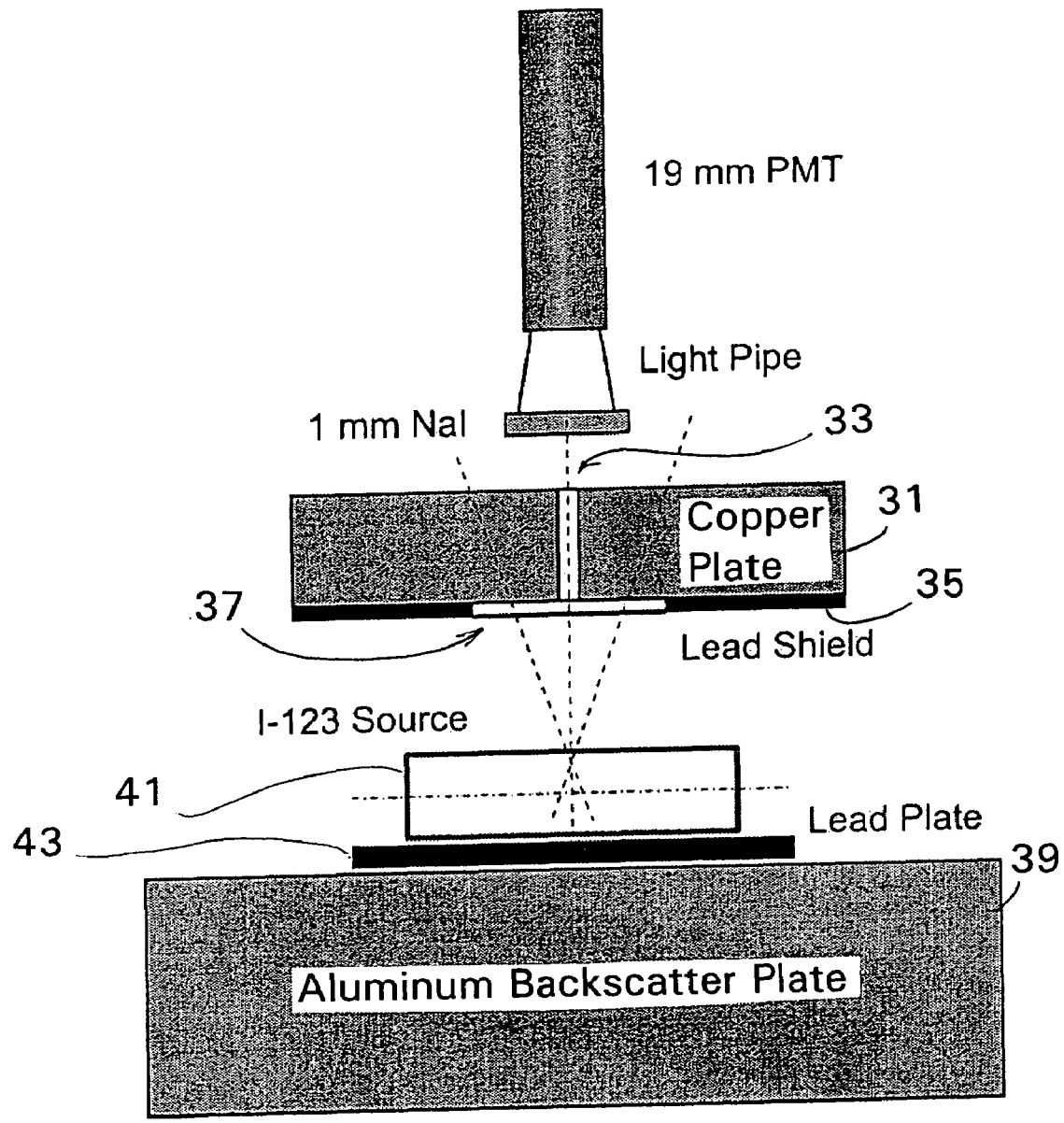
FIG. 8 is a diagrammatic elevational view of an x-ray imaging experiment using copper as a collimator material.

Observing FIG. 8, is a model for observing the x-rays in the presence of the high-energy gamma ray. The copper plate 31 is one inch thick and simulates the collimator. A 5 mm hole 33 simulates the sum of the holes in the focusing collimator. The lead shield 35 has an opening 37 to simulate the front aperture of the collimator. An aluminum block 39 under a source 41 is used to simulate backscatter from the other parts of the device. A removable lead plate 43 between the source 41 and the aluminum block 39 is used to explore the backscatter contribution.

Figure 9:
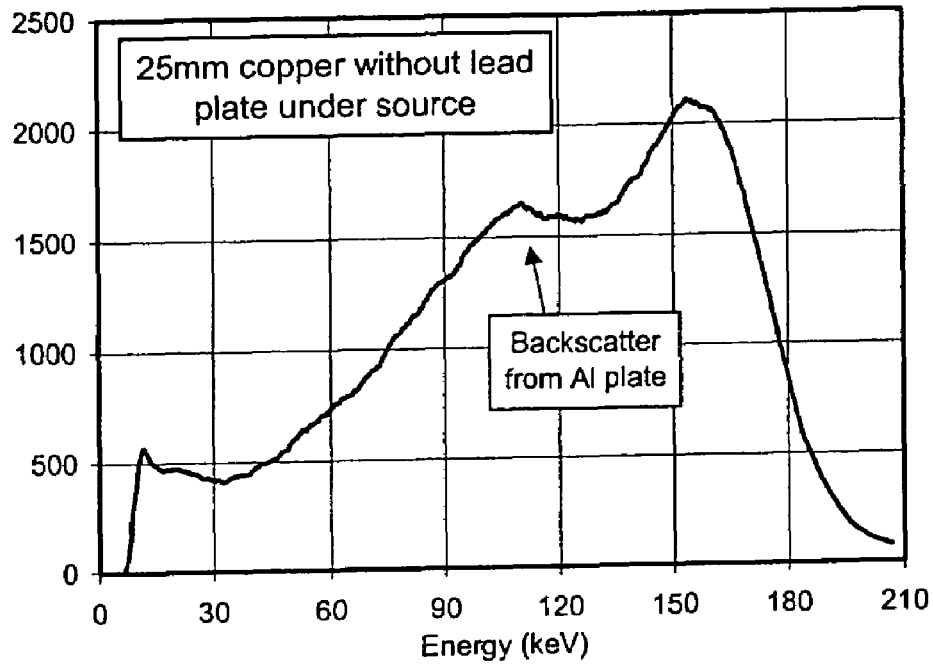
FIGS. 9 and 10 are graphical results of the measured energy in keV as seen by the NaI detector in the experimental model of FIG. 8.

FIG. 9 illustrates a curve showing the spectrum of the gamma rays emerging from the copper (a solid block or plate, i.e., no 5 mm hole) as seen by the 1 mm NaI detector. The primary energy at 159 keV is seen as well as multiple-scattered gamma rays. A small backscatter peak from the aluminum plate under the source is also seen. (In this case the lead plate between the source and the aluminum has been removed.) The same experiment was also tried with 13 mm of copper and got the same spectrum shifted up about a decade. The pertinent observation from these experiments is that there is a minimum at the 27.3 keV average energy of the tellurium x-rays.

Figure 10:
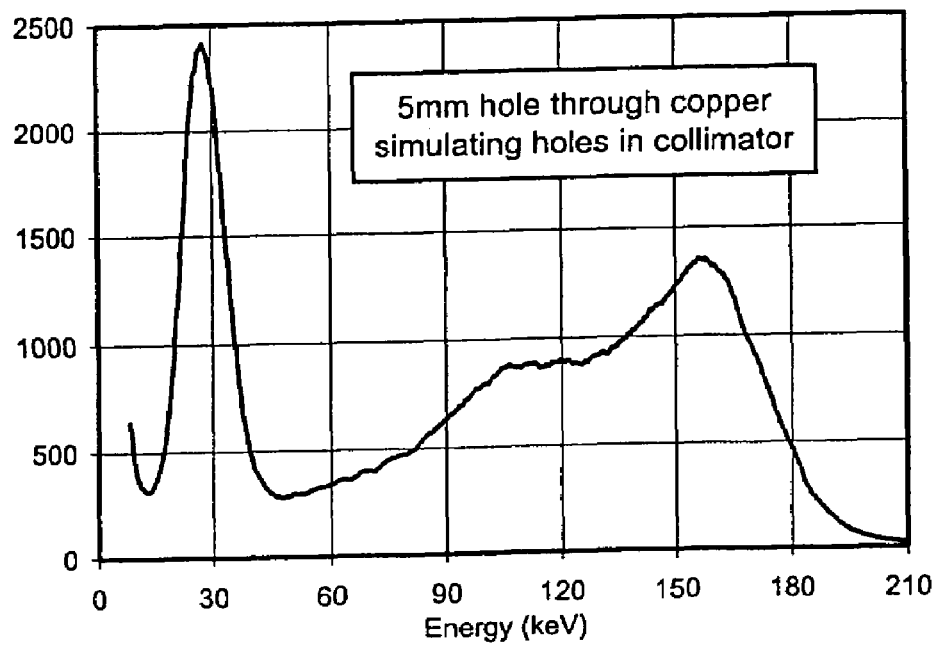

FIG. 8 shows a 5 mm hole drilled through the copper, and the measured energy illustrated in the graph of FIG. 10, to approximately simulate the effect of the sum of the hole array area in the collimator. Significant activity is indicated by this curve around the 27.3 keV range without serious interference from the 159 keV gamma ray.

In a related matter, the above noted data was taken using a NaI(Tl) crystal scintillator. This scintillator is used in our brain scanner and widely used in SPECT "gamma cameras" because its high density and high atomic number maximize its sensitivity to high-energy gamma rays, this is not what is the most desirable for a small animal scanner.

Figure 11:
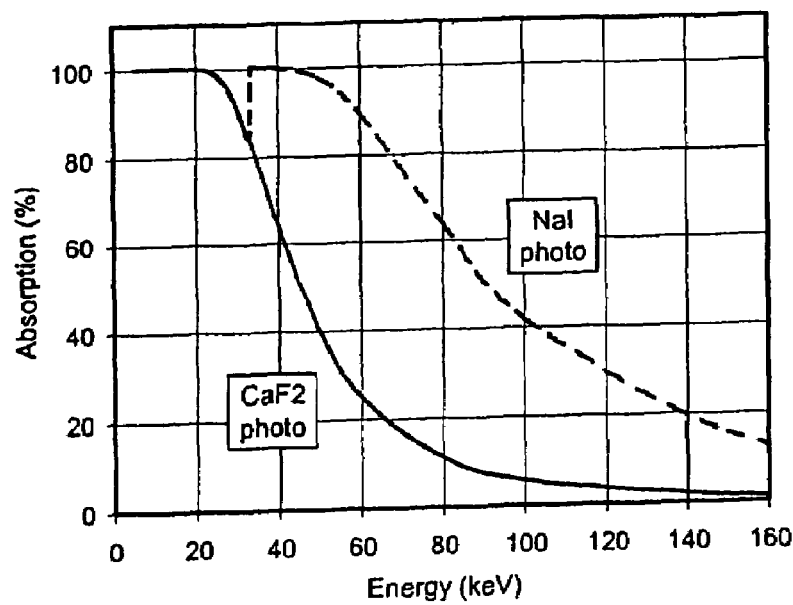
FIG. 11 is a comparison of the absorption of two different scintillation materials NaI(TI) and CaF2(EU)
Figure 12:
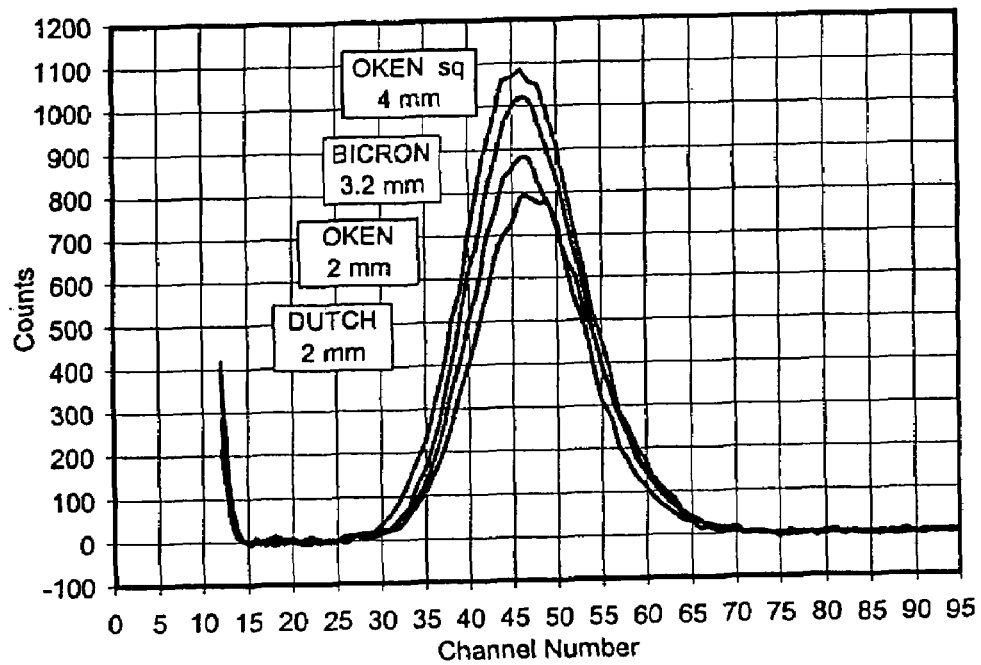
FIG. 12 are more complete test results for CaF2(EU) samples.

For the animal scanner application, a scintillator is needed that would let high-energy gamma ray photons pass through without interacting, but stop x-ray photons (and produce scintillations). A low-density scintillator, such as plastics (e.g., doped p-terphenyl), organic crystals (e.g., anthracene) and inorganic crystals (e.g. $CaF_2$) are more preferable. Of these, $CaF_2$ activated with europium had several advantages and was chosen. The graph of FIG. 11 compares the absorption of NaI(Tl) and $CaF_2$(Eu). The NaI is 1 mm thick and the $CaF_2$ is 3.8 mm (adjusted to equal NaI at low energies. The important point is that the $CaF_2$ is much less sensitive at high gamma ray energies. Typical x-ray spectra using $CaF_2$ (Eu) crystals are shown in FIG. 12. Another possibility is doped p-terphenyl which has comparable light output. This data of FIG. 12 was taken on samples of $CaF_2$ from various vendors. The numbers in the boxes are the crystals thickness. The crystals were various sizes and the counts have been normalized to their areas. The thicker crystals stopped more of the x-rays and gave more counts.

The x-ray source is Cs-137. About 6% of the decays yield a 30 keV x-ray that is what we see in these curves. It also emits 662 keV gamma ray photons with about 14 times the x-ray flux. A background has been subtracted from this data, the amount was actually quite small and did not interfere with the recording of the x-rays.

Figure 13:
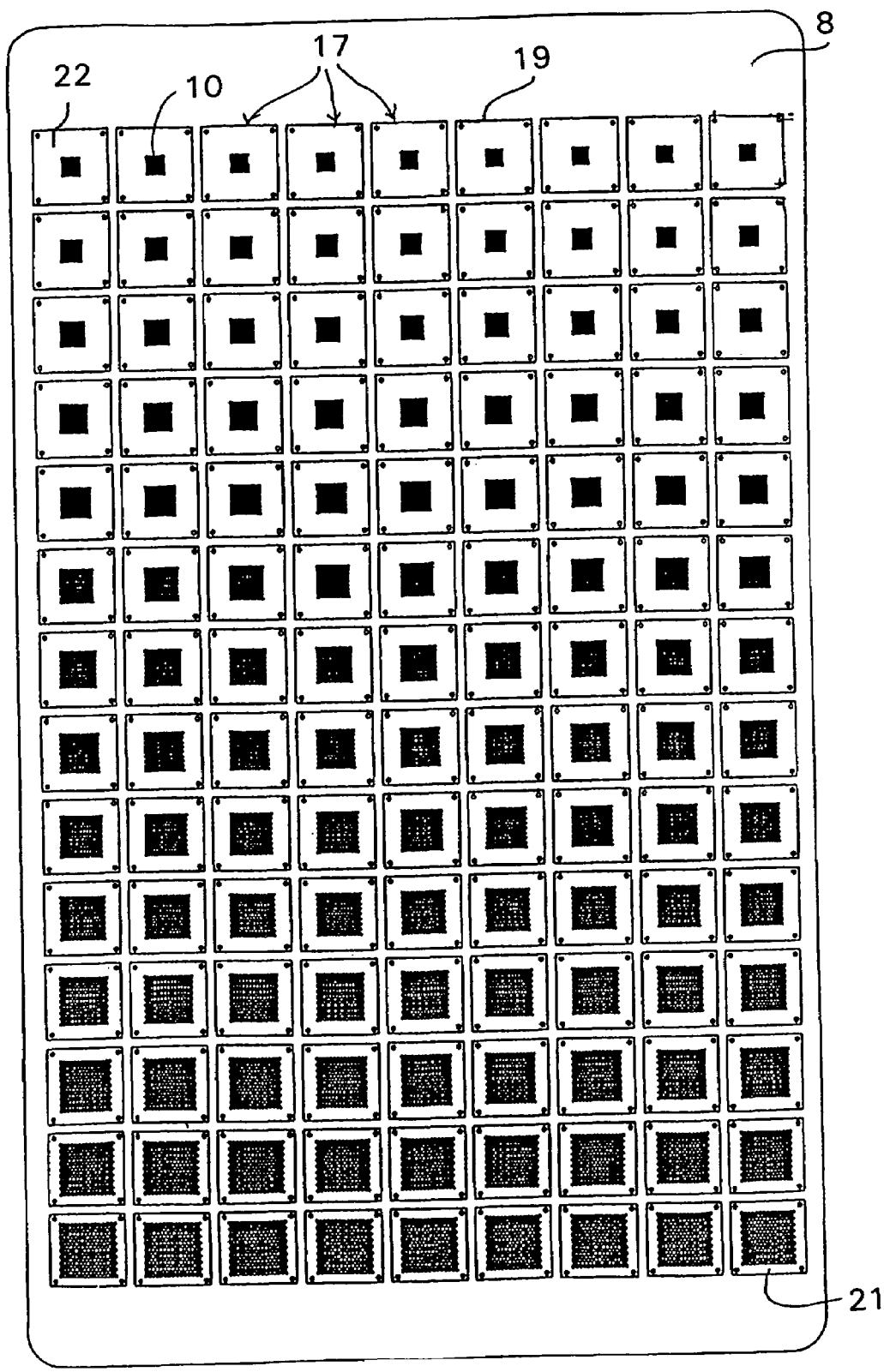
FIG. 13 is a chemically-etched metal sheet revealing individual plates with hole arrays.

Turning now to the structural aspects of the small animal collimator itself, and to the aspect of physically manufacturing a collimator capable of providing sufficient sensitivity and resolution on a small scale can be difficult and expensive. Instead of cutting, casting or otherwise forming the collimator from a single block of material, as known in the art, the collimator of the present invention is constructed by stacking a plurality of individual plates having holes formed therein to define gamma ray passages. With reference to FIG. 13, a sheet of metal 8 is formed, i.e., stamped, cut, chemically etched, such that the metal sheet 8 reveals the series of plates 17, having a generally square or rectangular perimeter although varying dimensions and other perimeter shapes for the plates 17 are conceivable. The plates 17 formed in the metal sheet will eventually be separated into the individual plates 17, shown in FIG. 14, aligned and stacked into a collimator 3 structure as seen in FIGS. 15a and 15b, and as explained in further detail below.

Figure 14:
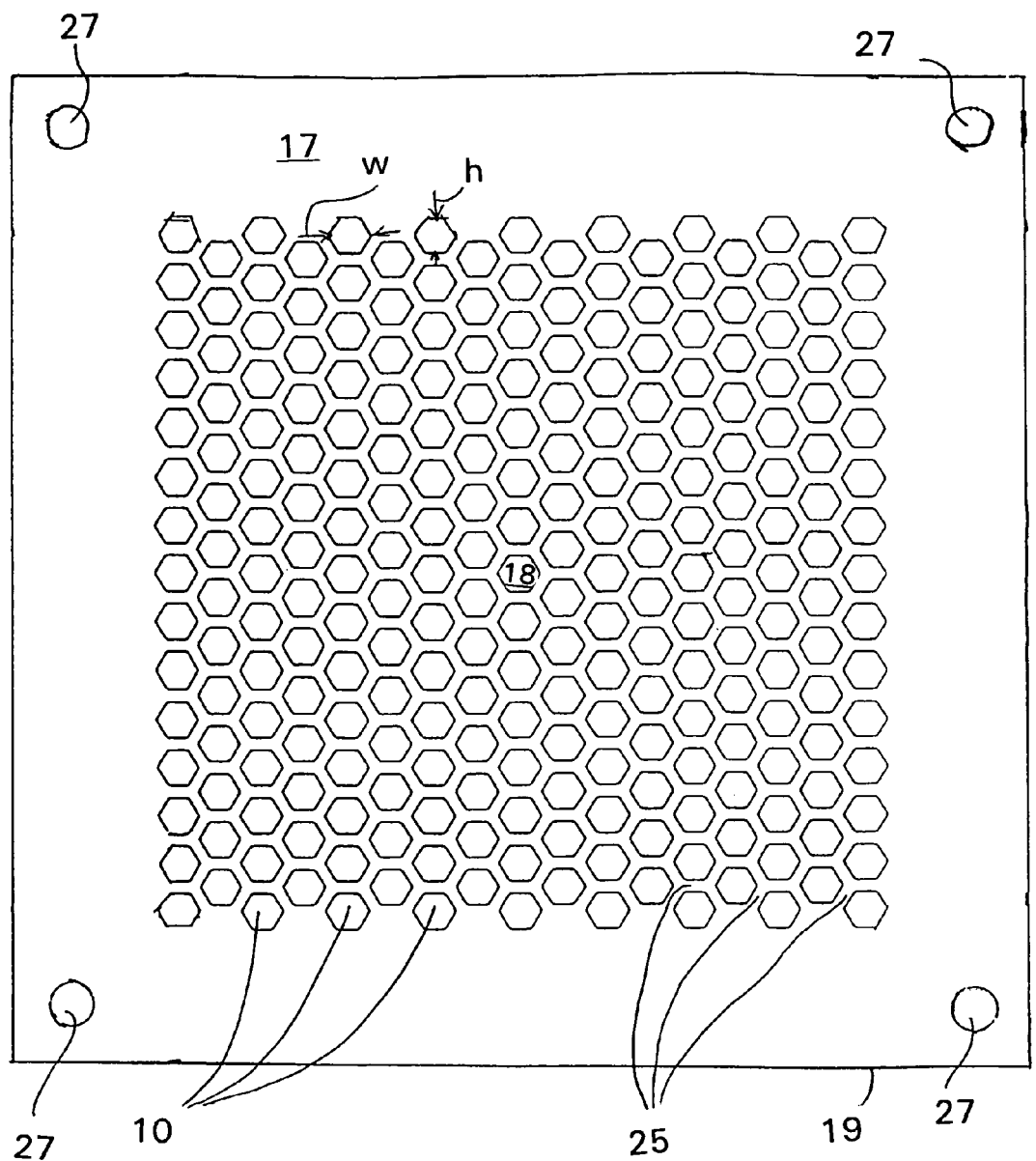
FIG. 14 is a plate having an array of hexagonally shaped holes.

Observing FIG. 14, the plates 17 can be formed by the process of chemical etching as shown in the present embodiment, beginning with the top plate 21 of the collimator 3, as an example having hexagon-shaped holes 10 ranging, for example, from about 1.17 mm at a widest point to 1.01 mm at its narrowest point are etched or cut into the plate 21. For purposes of simplicity, we will define such hexagon-shape holes 10 essentially as circles, having a relative diameter estimated as one-half the narrowest dimension plus one-half the widest dimension, in the present example, that being a diameter of about 1.09 mm. The holes 10 are equidistantly radially dispersed about a center point defined by a center hole 18 of the plate 21 with the septa 25 being approximately 0.341 mm, i.e., away from the edge of the nearest hole 10.

For a collimator 3 of this size, It is necessary to provide the appropriate resolution and sensitivity for small animal imaging, the present embodiment provides a series of approximately 251 plates 17, which will be stacked to form a collimator 3 about 1 inch (25.5 mm) thick. Each plate 17 has an array of 251 holes 19 comprising 17 offset and alternating rows, with each row having either 15 or 14 holes 10 per row to form the array of 251 holes 10. The sheet of metal 8, and hence each plate 17, is approximately 0.1016 mm (0.004 in.) thick, having an outer perimeter 19 defined by approximately 26 mm sides and each plate 17 has an alignment hole 27 near each of its four corners, the alignment hole 27 having a diameter of approximately of 1.5 mm.

Figure 15:
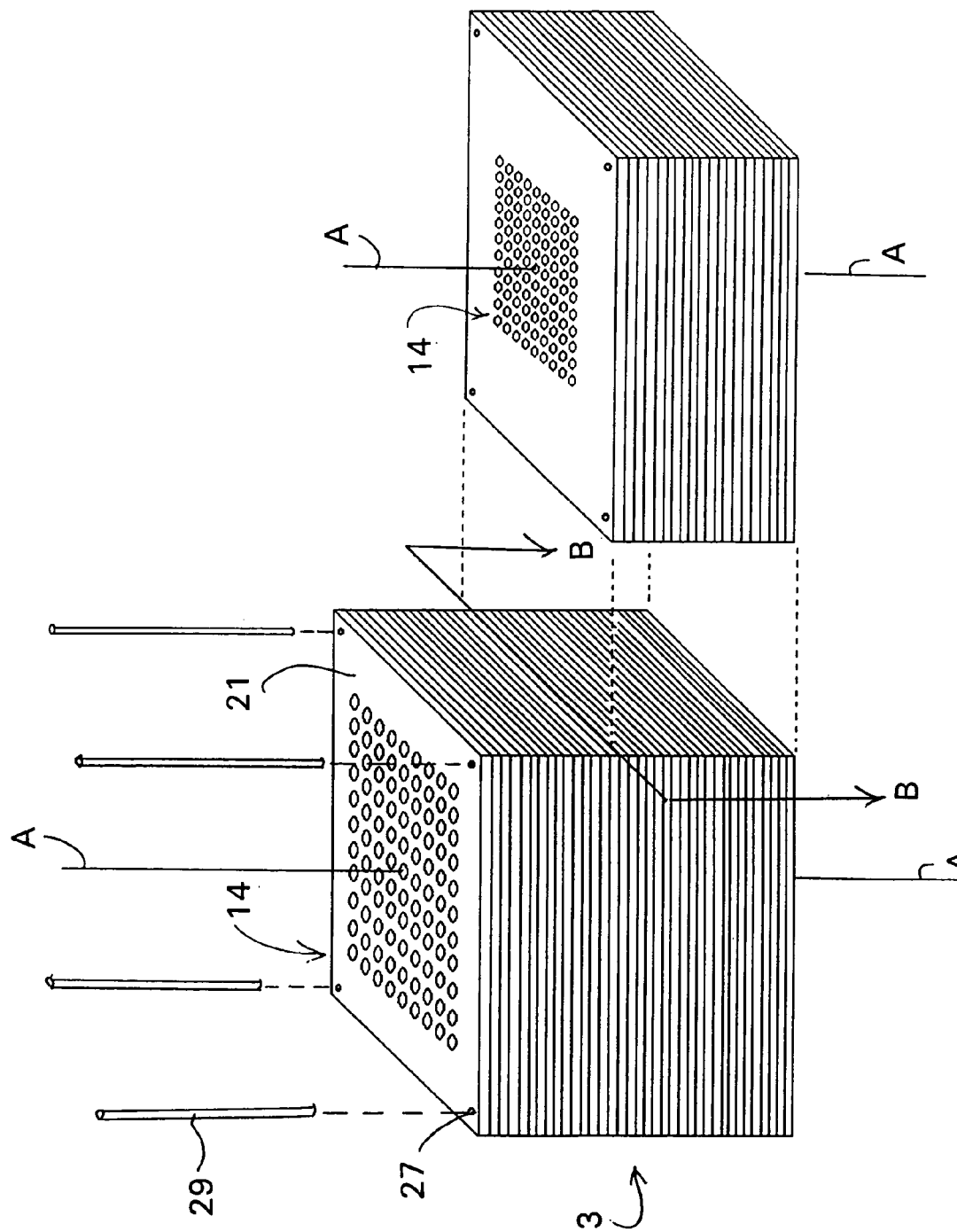
FIG. 15A is a three-dimensional view of a collimator made from stacked plates.
FIG. 15B is a partial cross-sectional view of stacked plates.
Figure 15B:
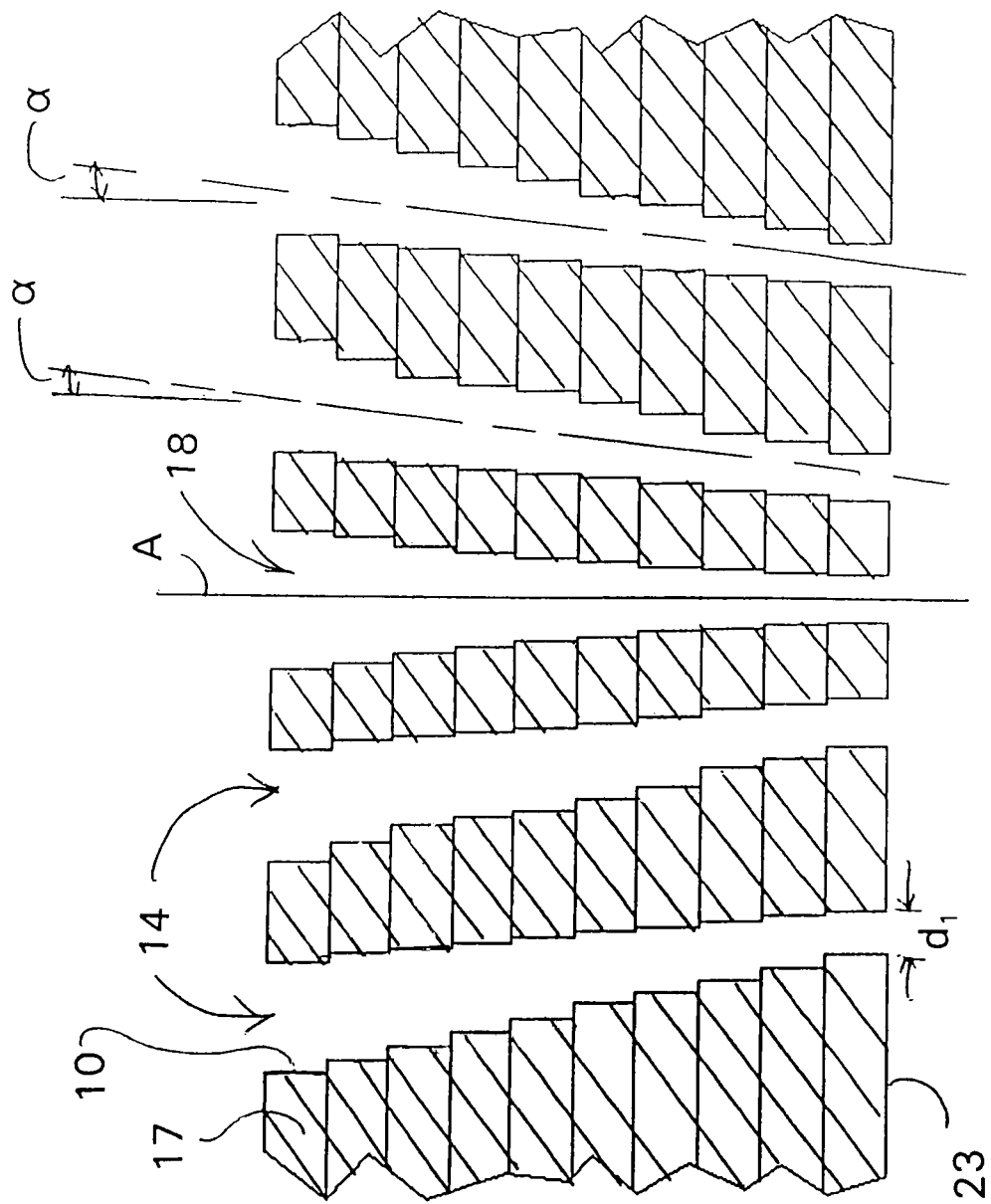

Observing FIGS. 15A, 15B, the alignment holes 27 allow for a securing means such as metal pins 29 inserted in the four holes 27 to retain the stack of plates 17 as a block to create the collimator 3. The holes 27, which extend perpendicularly through the stacked plates 17 relative to the planar surfaces of the plates 17, are important for the fact that concise stacking and precise alignment of the plates 17 is critical in producing the appropriate alignment of the stacked plates 17 and the arrays of the 251 holes 10 of each plate 17 to form the gamma ray passages 14 through the collimator 3 as discussed in further detail below.

The plates 17 are etched or cut in such a manner that although the size, i.e., the diameter of the holes 10 on each individual plate 17 are similar, the relative size of the holes 10 from plate to plate is different. For example the holes 10 formed in the top or first top plate 21 are generally the largest and, in the next adjacent or second plate, the holes 10 are formed to be slightly smaller with each subsequent hole 10 of the subsequent adjacent plates 17. It is important, however, that each adjacently aligning hole changes with constant step in the previously mentioned range to avoid curved pathways. By way of example, intermediate plate 17' has smaller holes than plate 21 although they are aligned to form the passageway 14. Thus, when the plates 17 are stacked to form the collimator 3, the cumulative effect of each of the relatively aligned, decreasing diameter holes 10 is to form a tapering passageway from the first or top plate 21, narrowing through the intermediate stacked plates 17 to the smallest aperture sized hole 10 in the last or bottom plate for permitting the passage of gamma rays through the collimator 3.

It is also important that the radial distance of each relatively aligned hole 10 in each adjacent plate 17 varies from a central axis of the collimator 3. By way of example, in the first or top plate 21 which has the largest holes 10, each of the holes 10 is spaced radially farther from a central axis A of the collimator 3 than the holes 10 of the second or next adjacent plate. Conversely, on the bottom plate 23 having the smallest holes 10, these holes 10 are radially closest to the central axis A of the collimator 3. Thus, each of the passages 14 formed by the relative aligned holes 10 not only tapers, but also slants inward at an angle relative to the central axis of the collimator 3 as shown in the partial cross-section of FIG. 15B.

Figure 16:
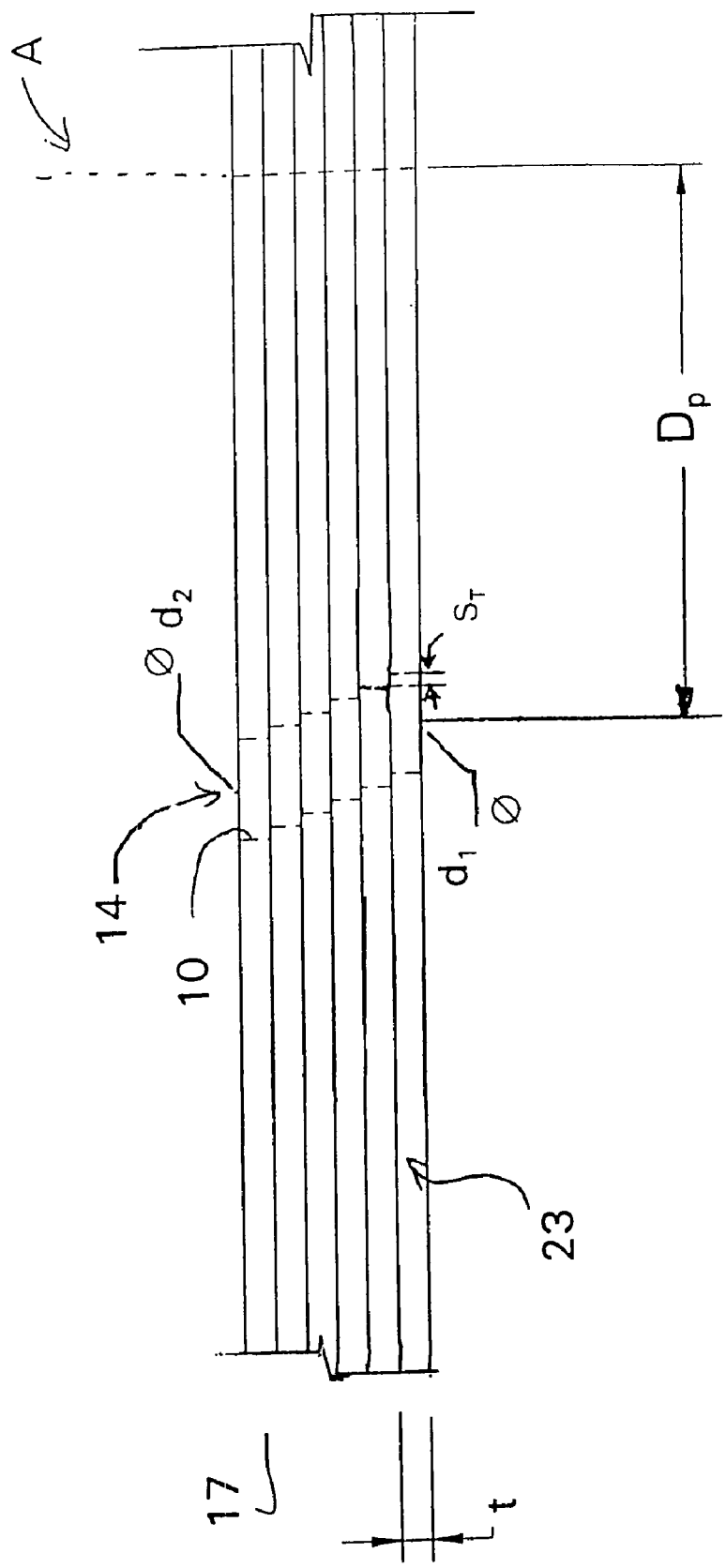
FIG. 16 is a partial side view of a series of stacked plates showing a set of offset holes.

Thus, as shown in the simplified cross-section of FIG. 16 showing only a portion of the intermediate plates 17, going from the bottom or last plate 23 having the smallest diameter holes $d_1$, the subsequent plates 17 have an incrementally increasing hole 10 size and a correspondingly increasing radial distance from the central axis of the plate $D_p$. The increase in hole 10 size or diameter $d_1$ to $d_2$ and septum distance (not shown) between the holes 10 and corresponding radial distance of the holes $D_p$ between adjacent plates 17 is incremental such that a common step size $S_T$ is used between any two adjacent plates 17. In other words, each adjacent hole 10 defining the gamma ray passage 14 is either bigger or smaller and slightly offset from the preceding or subsequent holes 10. More specifically, as the radial distances $D_p$ for holes 10 of adjacent plates 17 that define a gamma ray passage 14 from the central axis A increases, the diameter of the holes increases, i.e., the diameter of the hole of the top plate d2 is larger than the hole of the bottom plate d1.

It is to be appreciated that the central axis A of the collimator 3 may or may not be defined by a central gamma ray passage 14 in each of the stacked plates 17 as seen in FIG. 15B. Any central gamma ray passage 14, although tapering from a largest hole 10 in the top or first plate 21 to a smallest aperture defining hole 10 in the last or bottom plate 23 will not be angled or slant relative to the central axis A, but is essentially formed perpendicularly straight through the center of the collimator 3, i.e., it defines the perpendicular central axis of the collimator 3. It is also to be appreciated that the change in hole sizes and center offsets from plate to plate must be a fixed amount for each hole location. For the center hole the size will increase linearly from bottom to top and its offset will be zero from plate to plate. The corner holes which have largest increment of hole size as well as the largest offset of centers between plates. Fixed percentage changes will lead to curved holed and tapers.

Accordingly, with the central holes 10 in the plates 17 defining a central gamma ray passage 14 and, in turn, a central axis A of the collimator 3, the remainder of the passages are all angled with respect to the central passage, with the passages closest to the central passage angled at a relatively smaller angle α to the central passage than those passages spaced radially farther away from the central passage. This provides a focal point of all the passages occurring at a desired distance from the collimator.

It is not always necessary that there be central gamma ray passage in a collimator. In general, the axis of a collimator is a line drawn through the geometric center of the back array of holes and the geometric center of the front array. An "on axis" collimator is one in which the focal point lines on this line. An "off axis" collimator can be made for special purposes in which the focal point does not lie on this line or where there are multiple focal points. With multiple focal points tapered holes within the collimator may intersect. It is to be appreciated that a central tapered hole is not necessary, for instance the collimator axis can lie on the centroid of a square formed by four adjacent square holes closest to the collimator axis. In this case, there would be no central gamma ray passage.

Turning to a second embodiment of a collimator as shown in FIGS. 17-20, showing as an example a first or top plate 21 in the series of stacked plates may define an array of approximately 0.565 mm diameter holes 10 therethrough, although other sizes of arrayed holes 10 may also be contemplated. A last or bottom plate 23 in the series will also be provided with a similarly numbered array of holes 10, however the holes 10 in this bottom plate 23 have a substantially smaller diameter in the range of about 0.320 mm in diameter. The holes 10 may be of any shape, for instance, square or circular, but can be hexagon-shaped to facilitate a compact alignment and consistent septum 25 distance, i.e., a substantially uniform distance between the side of any one hole 10 and any of the adjacent holes 10 in any one plate 17.

Figure 17:
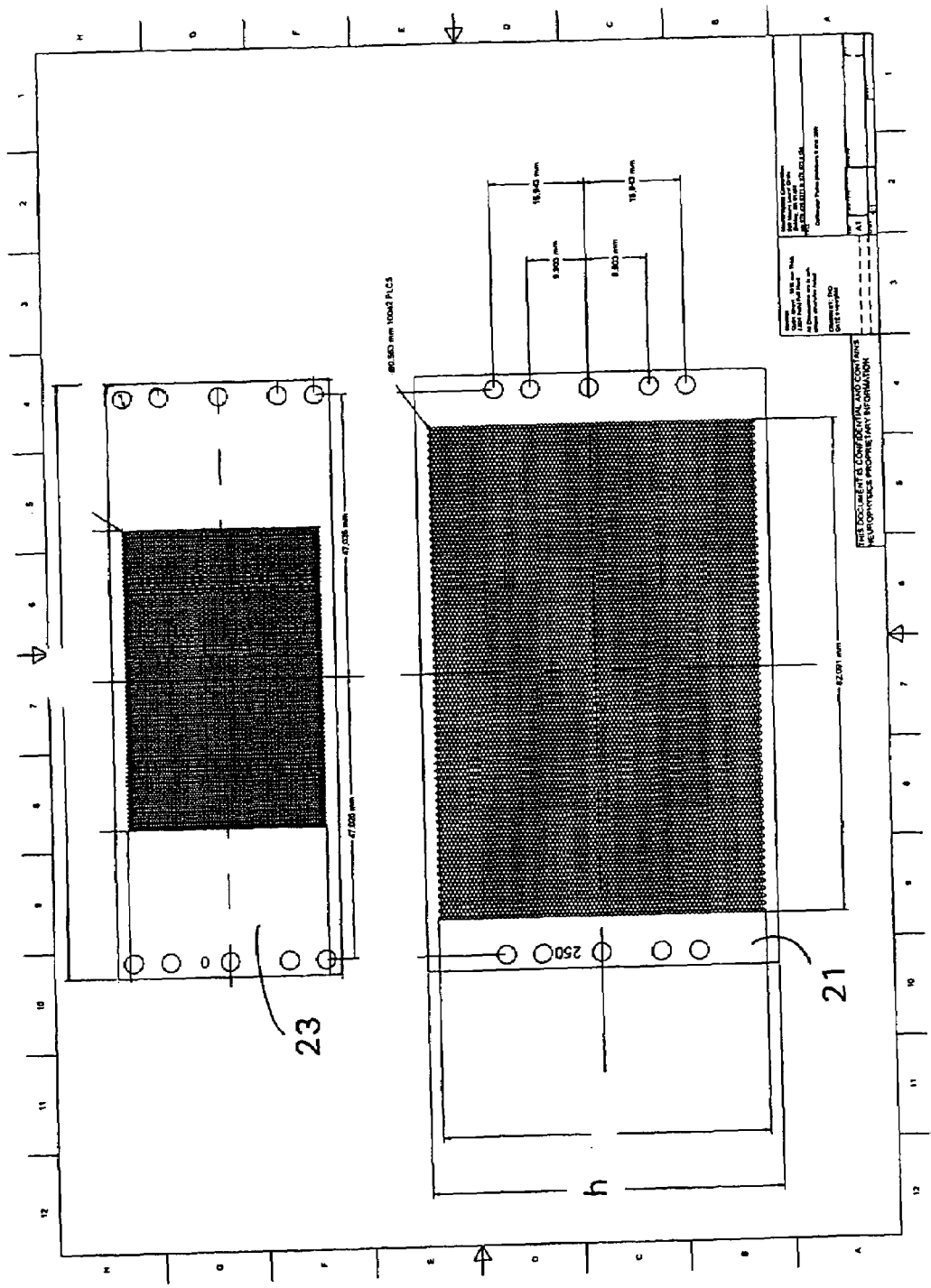
FIG. 17 is a schematic of a second embodiment of rectangular plates with circular holes.
Figure 18:
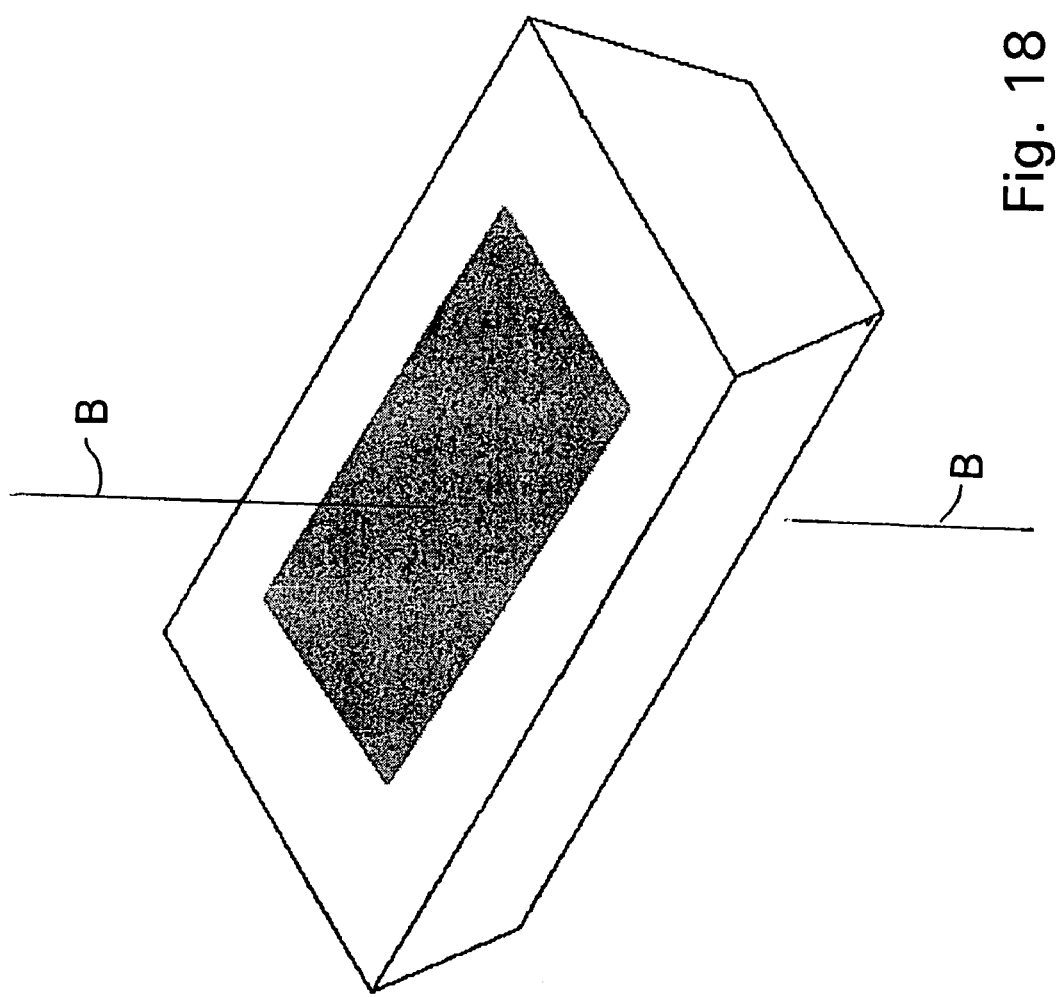
FIG. 18 is a 3-dimensional perspective view of the collimator of the second embodiment.
Figure 19:
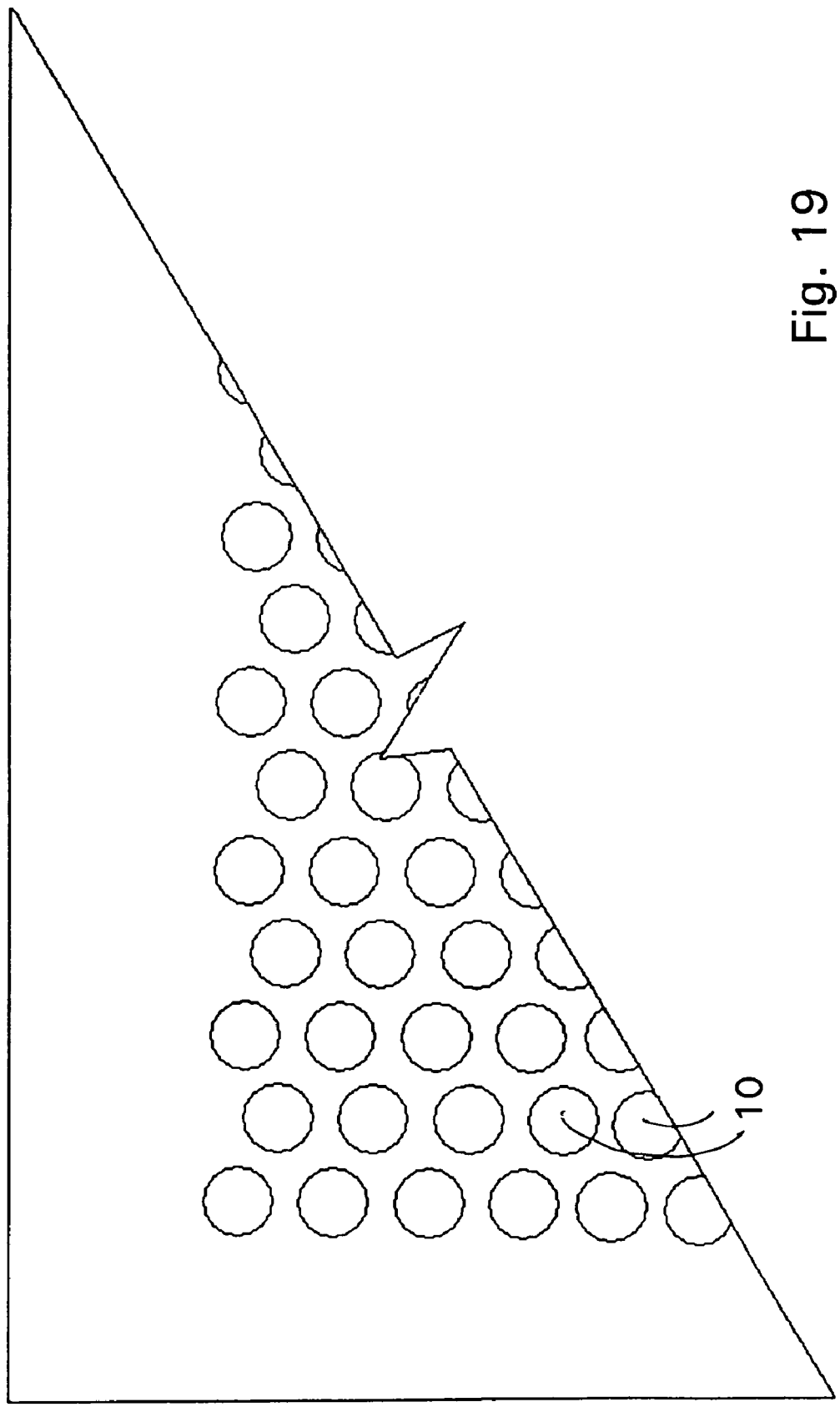
FIG. 19 is a close-up planar view of a section of rectangular plate with circular holes.

As shown in FIGS. 17-20, an embodiment utilizing a stacked series of rectangular plates 17 with circular holes 10 is used. The plates 17, 21, 23 are created using a chemical etching, casting or machining process as previously described. The plates shown in FIG. 17 represent the top plate 21 and the bottom plate 23 plate of the collimator 3. The plates differ in width and when stacked, as shown in FIG. 18, the resulting structure has a trapezoidal cross-section along an axis B through its center. The circular holes 10 of this second embodiment, shown close-up in FIG. 14, are arranged in a similar pattern such that the adjacent plates 17 have an substantially identical row-column structure of the holes 10. Similar to the first embodiment, however, the holes 10 of adjacent plates 17 differ in radial distance to an axis of the collimator 3.

This second embodiment can have holes ranging in size from about 0.565 mm diameter on the top plate 21 to about 0.343 mm on the bottom plate 23. It is to be appreciated that the size of the holes, as well as the length, i.e., the stacked height of the collimator, is application specific for example, for use with a small animal such as a mouse, the collimator itself is extended so that the bottom plate 23 includes about 0.206 mm holes. Although it is conceivable that other sized arrays could be used, in the present embodiment, each plate 37 has an array of 10,042 holes 30 comprising offset and alternating rows with each row having 67 or 66 holes per row, in columns of 76 or 75 holes respectively to form an array of 10,042 holes, Once the plates are completely etched, they are stacked and secured in an order from top to bottom in decreasing incremental size. The plates 17, 21, 23 are aligned such that the holes 10 on each plate partially align, i.e., they are partially offset, with the holes 10 on the next adjacent plate to create a plurality of tapering passageways extending from each of the holes 10 on the top plate 21 through the corresponding holes 10 on each intermediate plate 17 to the corresponding holes 10 on the bottom plate 23.

Due to the above described structure and method of assembly of the collimator 3 and its passageways by stacking a plurality of plates 17, the inner walls of the passageway have a step-like feature or function which differs from the smoothly machined or cast walls of known collimators 3. This step-like features of the inner walls of the gamma ray passage 14 have little to no effect on the resolution or sensitivity of the collimator 3.

It is possible to alleviate the step-like features of the inner walls of the gamma ray passages 14 by making each hole, in each individual plate having a substantially angled sidewall with respect to the top and bottom surfaces of each plate. In other words, using conventional masking techniques to form the holes in each plate will normally form a hole, or each hole, having a straight side wall, i.e., a sidewall formed perpendicular to the top and bottom surfaces and hence the hole formed about an axis which is aligned perpendicular relative to the top and bottom surfaces of the plate. Thus, as described above with each straight sidewall hole in each adjacent plate formed slightly offset from both the previous and next adjacent hole, the stepped sidewalls of the passage are obtained.

It is possible to mask each side of the plate with masks defining differently sized mask holes, and even relatively offset mask holes. Then by chemically etching each side of the plate in accordance with the applied mask provides a hole with sloping sides or defined about a non-perpendicular axis relative to the top and bottom surfaces of the plate. At the very least by etching differently sized holes on either side of the plate, an intermediate step is formed in the defined hole such that each correspondingly adjacent step between each plate is accordingly smaller.

Figure 20:
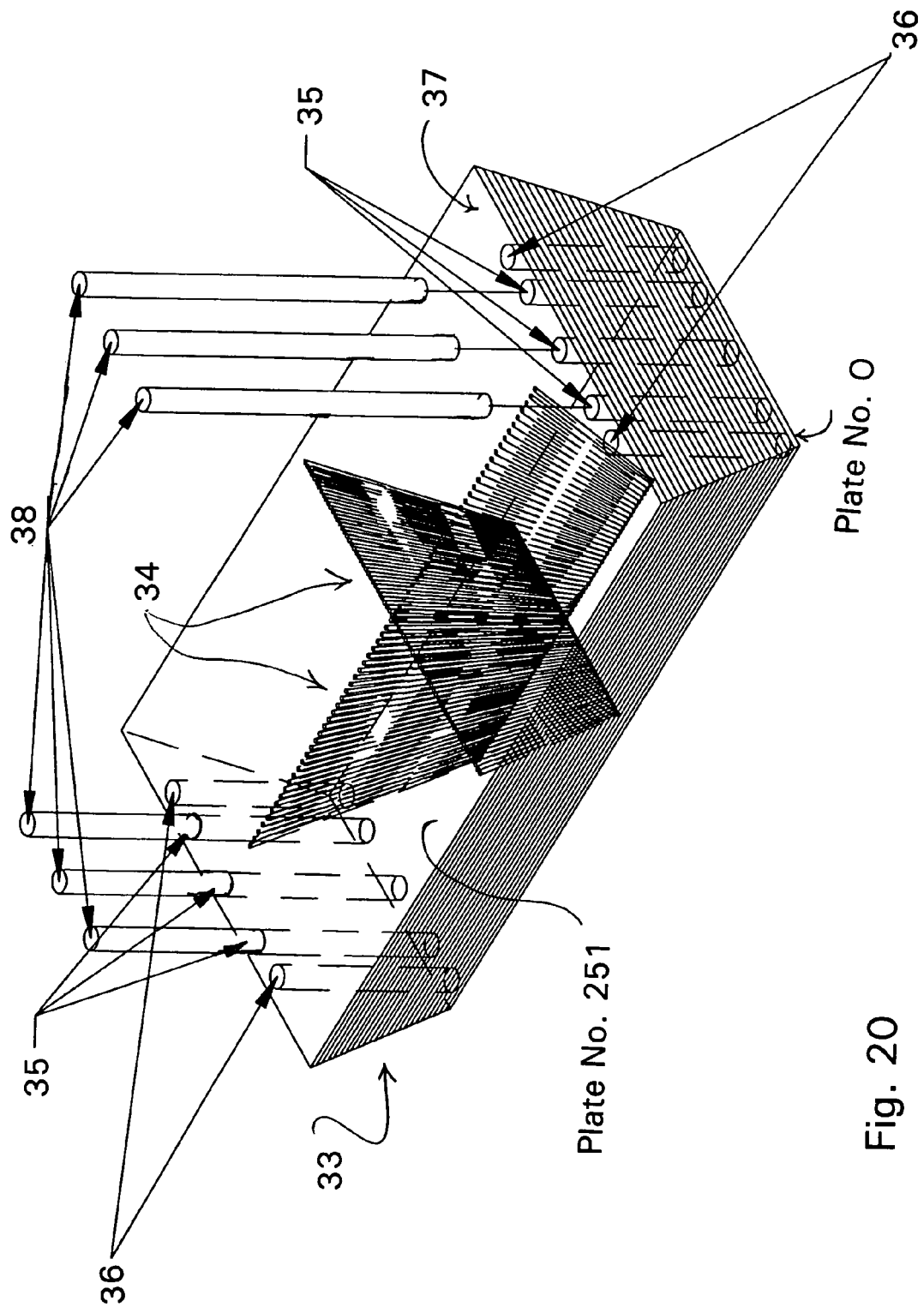
FIG. 20 is perspective view of the second embodiment of a collimator.

In the second embodiment of the collimator generally shown in FIGS. 17-20 a complete detector structure is now described in conjunction with FIGS. 21-26. For the collimator 33 of the size necessary to provide appropriate resolution and sensitivity for small animal imaging, the present embodiment shown diagrammatically in FIG. 20 provides a series of approximately 251 plates 37 which are stacked to form a collimator about 1 inch (25.5 mm) thick. Although it is conceivable that other sized arrays could be used, in the present embodiment, each plate 37 has an array of 10,042 holes 30 comprising offset and alternating rows with each row having 67 or 66 holes per row, in columns of 76 or 75 holes respectively to form an array of 10,042 holes, only a portion of which are shown in FIG. 20. Each plate is also marked by the manufacturing process with a number, for instance, 0-251, corresponding to its position in the stack from the plate of smallest hole size to the plate of largest hole size. The plates 37 may vary in thickness to accommodate a particular etched hole size as described above and the plates 37 have an outer perimeter that varies with plate number from approximately 99.01×36.93 mm for the smallest hole plate, plate number 0, to approximately 99.01×58.052 mm for the largest hole plate, plate number 251.

Each plate 37 has an identical set of alignment and bolt holes, 35,36 such that bolt holes 36 are near the corners of each plate and the alignment holes 35 are spaced therebetween to provide sufficient alignment capability of the plates. The bolt and alignment hole pattern is replicated on all plates in the stack in order to provide 10 holes, 6 alignment and 4 bolt, which when the plates 37 are stacked provide through holes that are perpendicular to the planar surfaces of the plates for the purposes of facilitating plate alignment and plate stack retention. Each alignment and bolt hole is approximately 3.04 mm in diameter.

The alignment holes 35 allow for planar alignment of the plates by means of metal pins 38 of accurate size inserted into the six alignment holes 35 and extending substantially perpendicularly through all plates 37 in the stack. The four corner bolt holes 36 are used to bind together the stack of plates 37 as a block to create the collimator 33. The alignment pins and holes 35,36 which extend perpendicularly through the stacked plates relative to the planar surfaces of the plates are important to achieve concise stacking and precise alignment of the array of 10,042 holes of each plate which form the gamma ray passages 39 through the collimator as previously discussed.

The plates 37 are etched in such a manner that although the size, i.e. the diameter of the holes 34 on each individual plate 37 is the same, the relative size of the holes 34 from plate to plate is different. For example the holes 34 formed in the top plate, plate number 251, are generally the largest and in the next adjacent plate, plate number 250, the holes 34 are formed to be slightly smaller than those in the top plate. The pattern continues through to plate number 0, in which the holes formed are generally the smallest. Thus, when the plates are stacked to form a collimator 33, the cumulative effect of each of the relatively aligned decreasing diameter holes is to form a tapering passageway 39 from the top plate, number 251, narrowing through the intermediate stacked plates to the smallest aperture sized hole in the bottom plate, number 0, for permitting the passage of gamma rays through the collimator 33.

Figure 21:
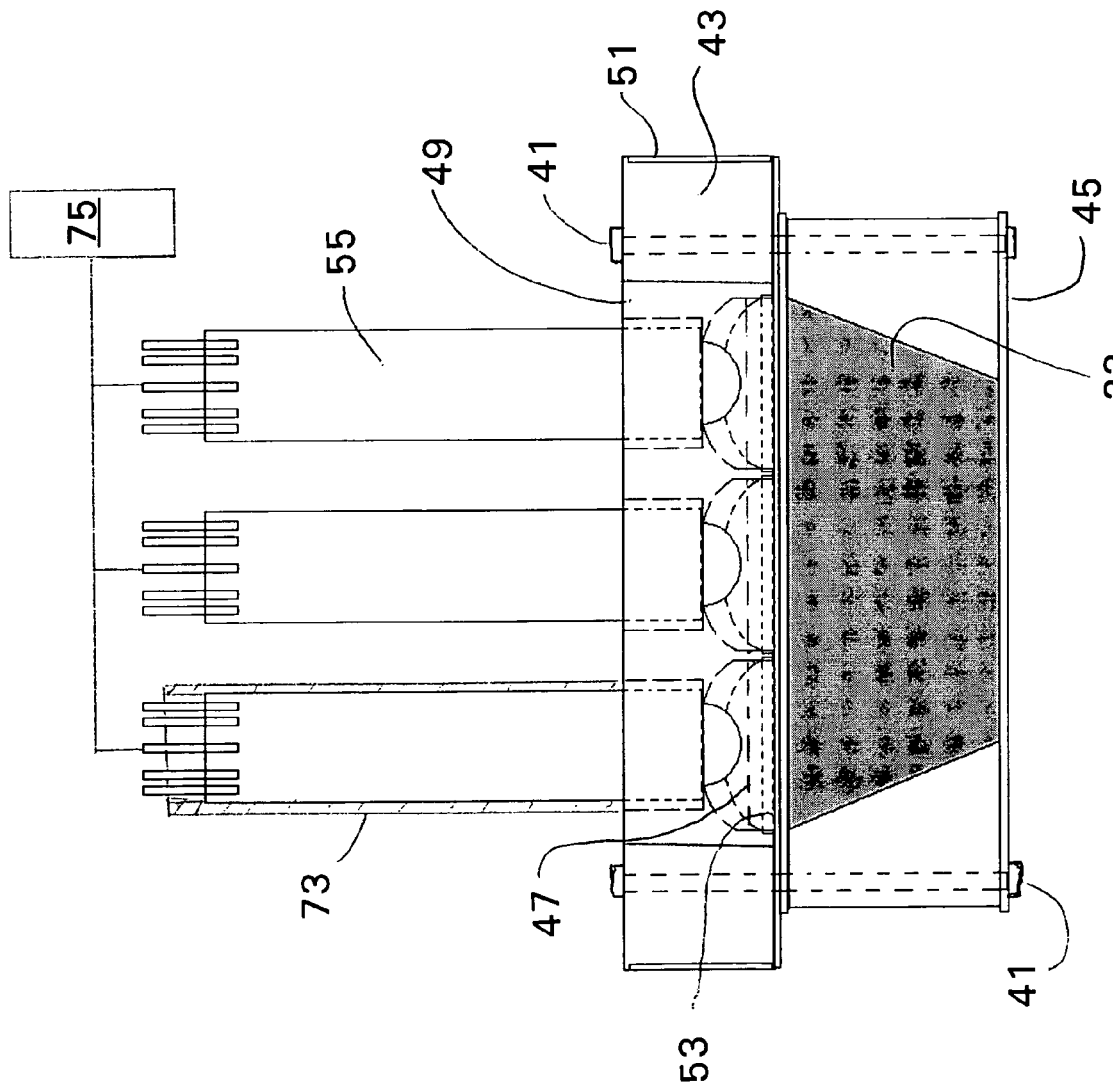
FIG. 21 is an elevational view of a detector including the collimator.

Observing FIG. 21, the collimator 33 is held together by pins 38 and/or bolts 41 which pass through each individual plate 37 as previously described. The bolts are then secured to a mounting block 43 which, in conjunction with the bolts 41 and alignment pins 38 and a front clamp plate 45 on the collimator, sandwiches the stacked plates 37 in their appropriate alignment against the mounting block 43. Once the bolts 41, pins 38 and plates 37 are in place with the mounting block 43, the collimator plates do not move or shift and the holes are in proper alignment to form the gamma ray passages 34 leading to scintillating crystals 47 and an optical integrator 49 described below.

The optical integrator 49 including the scintillating crystals 47 and a photomultiplier tube holder 51 are connected to the collimator 33 and the mounting block 43. The purpose of the optical integrator 49 is to secure the scintillating crystals 47 adjacent, or substantially adjacent, to the top plate of the collimator 33 having the largest holes and thus facilitate capturing all the gamma rays emerging from the collimator 33 by the crystals 47. In addition, the integrator 49 itself is designed to capture photons emitted by the crystals 47 regardless of proximity to the collimator 33. From a structural standpoint, the optical integrator 49 also stabilizes the stacked plates 37 of the collimator 33 by supporting the top of the collimator 33 across the face of the top most plate. The mounting block 43 and the front clamp plate 45 clamp the stacked collimator plates 37, but without the support of the integrator 49 against the top plate the collimator plates 37 would tend to bow in the middle and it would, therefore, not be aimed properly.

A Teflon® pad 53 is provided as a reflecting gasket to cover the scintillating crystals 47 between the face of the crystals and the top plate of the collimator 33. The low density Teflon® pad 53 is mostly air so there is no impeding the gamma rays exiting the collimator 33 and striking the crystals 47, and the Teflon® pad 53 provides some cushioning between the top plate of the collimator 33 and the faces of the crystals 47. The Teflon® pad 53 provides a diffuse reflecting, low absorption medium for photons emitted by the crystals 47. Considering the cavity coating described below and the Teflon® pad 53 together the crystals 47 are substantially surrounded with optically diffuse reflector material. The Teflon® pad 53 gives photons scattered from the crystals 47 headed away from the photomultiplier tube 55 a chance to be reflected back toward the photomultiplier tube 55 so that any such wayward photons can be collected and counted. The entire optical integrator 49 can then also be wrapped in aluminum tape or similar material to help make the device as light tight or optically isolated as possible.

Figure 22A:
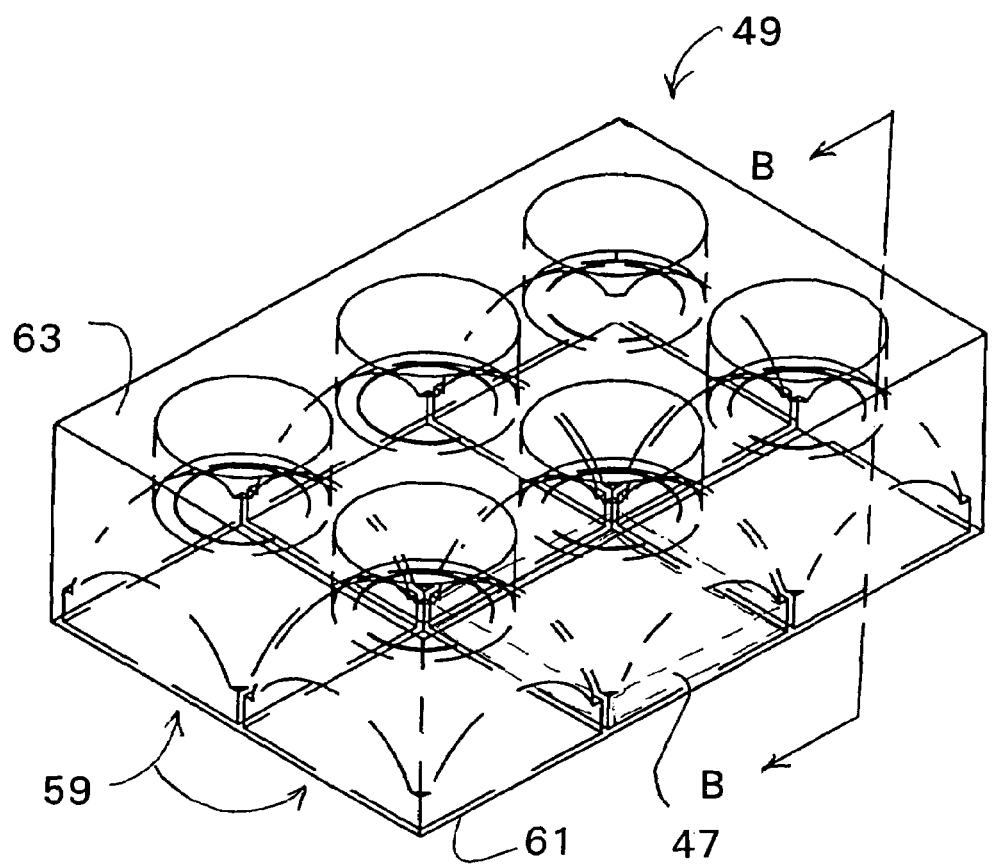
FIGS. 22A and 22B are a perspective view and a cross-sectional view respectively of the optical integrating cavities.
Figure 22B:
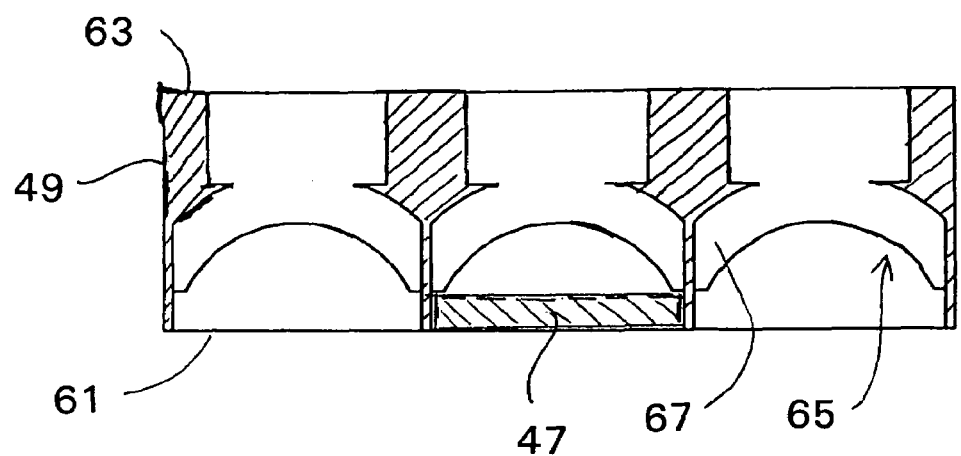

Turning to FIGS. 22A, 22B the optical integrator 49 have an eggcrate type appearance and provides the connection between the collimator and the photomultiplier tubes 55. The optical integrator 49, shown in FIG. 22A, consists of six cavities 59, each cavity of which is designed to hold a crystal and an associated photomultiplier tube. In the present embodiment, six (6) crystals and six (6) corresponding photomultiplier tubes are intended to be used with the optical integrator 49 to connect to the collimator 33, although it is to be appreciated that other numbers and combinations of crystals and photomultiplier tubes are possible.

Each of the six cavities 59 of the optical integrator 49 are identical, so only one will be discussed in detail. The scintillating crystal 47 is supported in a seat on a collimator side 61 of the cavity of the optical integrator 49, and the photomultiplier tube 55 is supported on an opposing side 63 of the optical integrator 49. In between the crystal 47 and the photomultiplier tube 55, each individual cavity of the optical integrator 49 define an intermediate substantially hemispherical surface 65. This substantially hemispherical surface 65 is designed to facilitate the passage and reflection of photons emitted from the crystal 47 to the photomultiplier tube 55 in a minimum area and with a minimum number of collisions.

The hemispherical surface 65 is coated with a diffuse highly reflecting material such as barium sulphate or aluminum trihydroxide which tend to randomize the direction of photon reflections and prevent their loss. The diffuse reflective coating 67 is important because the crystal produces a fairly wide spread of photon directions. The high reflectivity and randomness of the of the diffuse reflection gives as many photons as possible a chance to be collected by the photomultiplier tube 55. Other diffuse reflective materials and coatings may be used as a surface coating as well depending on the source radiation. Ideally, the diffuse reflective coating material 67 should have a low atomic number so that its energy is low and thus fluorescence is low as well. These high energy gamma rays, for example, from a source of I-123 which have a higher energy of 150 KeV, are not focused by the collimator 33 and generate signal pulses in the photomultiplier that did not originate from the focus of the collimator 33. These unfocused, higher energy gamma rays can cause the coating to fluoresce and generate 32 KeV x-rays in a barium sulphate diffuse reflective coating which, in turn, create unwanted optical energy photons in the crystals.

Observing FIG. 21, the opposite side of each cavity 59 of the optical integrator 49 from the crystal 47, the corresponding photomultiplier tubes 55 extends into and is supported by each cavity in a cylindrical hole. Each photomultiplier tube 55 may be provided with a hemispherical lens 71 at an end within the particular cavity 59 of the optical integrator 49 in addition to its conventional lens in order to increase the surface area capable of receiving photons as they pass through the optical integrator 49. It is important, however, that the index of the hemispherical lens 71 is identical to that of the conventional lens in the photomultiplier tube 55 to ensure that no photons are lost as they pass from the lens to the tube.

A cylindrical tube holder 73 is placed over each of the photomultiplier tubes 55 to secure the tubes in conjunction with the optical integrator 49 and also to further insulate the optical integrator 49 and photomultiplier tubes 55 from unwanted outside light. Lastly, each of the photomultiplier tubes 55 is electronically connected to a sensor 75 which reads and interprets the collected data by the photomultiplier tubes 55.

In a novel aspect of the present invention which arises from the unique construction using the stacked plates, it is also preferable in some cases, depending for example upon the source radiation, to fabricate the stacked plates of the collimator from different materials. In other words layering plates of different materials to form the collimator and obtain certain desired results. For example by inserting certain plates made of tungsten or silver in with the stacked beryllium copper plates certain undesirable background noise can be eliminated.

By way of example, a capillary tube was filled to 20 mm of its length with I-123. In 83% of I-123 disintegrations, a 159 keV gamma ray is emitted. In addition, 72% of the decays produce $K_\alpha$ x-rays with an average energy of 27.4 keV and 15% produce $K_\beta$ x-rays with an average energy of 31 keV. Both are derived from the tellurium daughter's K-shell.

Initial tests involved using this source to find the focus of the collimator. The resolution was estimated to be about 1 mm by manually scanning across the diameter of the capillary tube. Then the capillary tube was left positioned at the focus.

Figure 23:
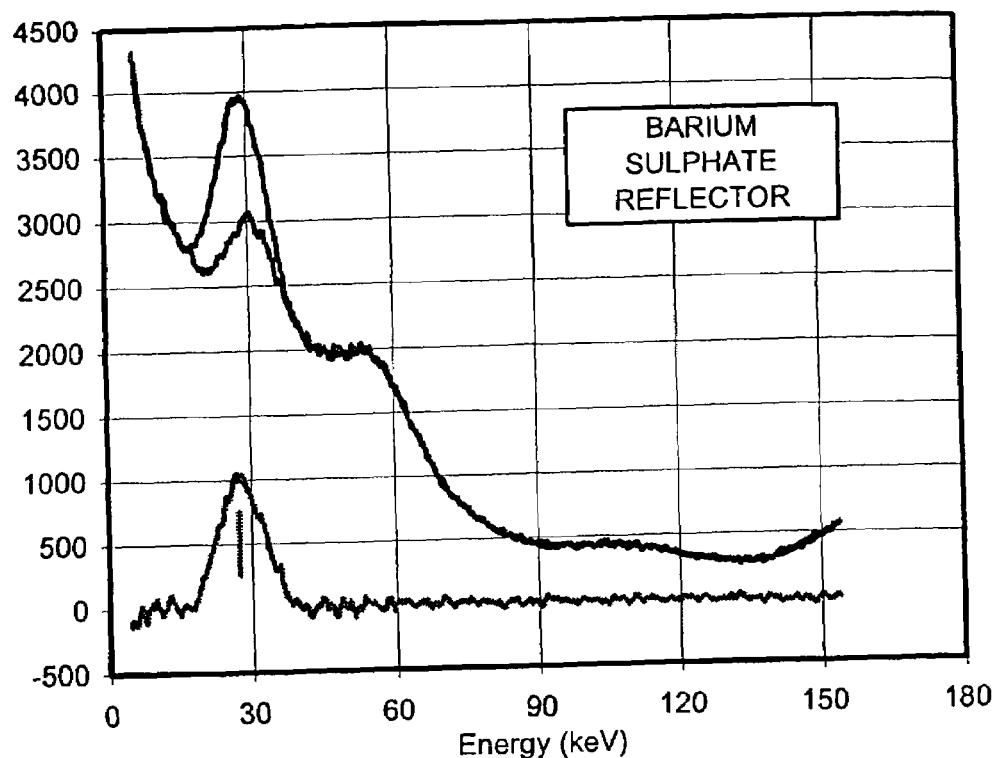
FIG. 23 is a graph of test results using barium sulphate as a reflector.
Figure 24:
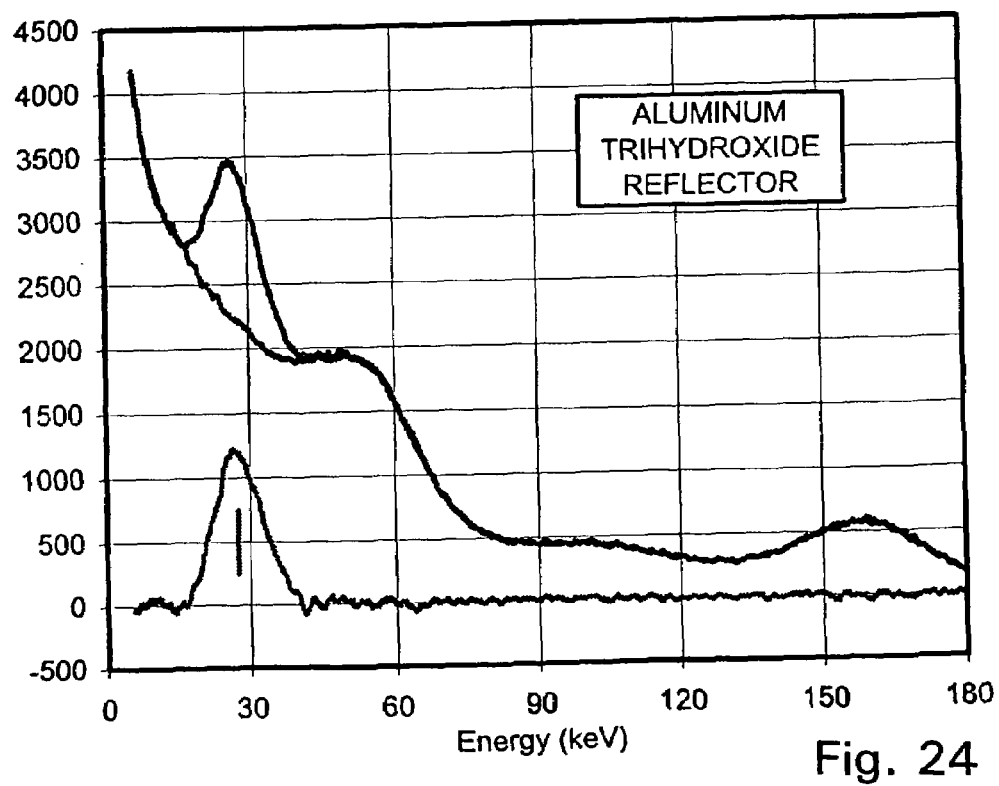
FIG. 24 is a graph of test results using aluminum trihydroxide as a reflector.

Spectra were taken using the standard $BaSO_4$ coating on the inside of the optical integrator i.e. in the semi-spherical "egg crate" cavities and separately, using the new $Al(OH)_3$ reflecting paint. The results are shown in FIGS. 23 and 24.

In both cases, the top curve is taken from data collected with no absorber between the capillary tube source and the collimator face. The second curve was obtained with a silver sheet between the capillary tube and the collimator face. This filter has sufficient thickness to stop K-shell x-rays from both Te and Ba but let higher energies pass through.

The peaks at 30+keV in the data taken using the $BaSO_4$ paint does not originate from the I-123 source, but comes from Ba K x-rays excited by the I-123 high-energy gamma ray that penetrates the collimator.

The lower curve is the algebraic difference between the filtered and unfiltered data and, therefore, shows only the tellurium x-rays coming from the part of the capillary tube source that is located at the collimator focus. The spectra were obtained after applying a number of corrections:

All data was adjusted to a total capillary tube source activity of 100 μCi assuming a half-life of 13.27 hours.

The radiation energies were adjusted to take into account the falloff in photon yield at lower absorbed energies by $CaF_2(Eu)$.

The curves with the silver sheet x-ray filter were adjusted upwards by 1.12 to take into account of some absorption of the 159 keV gamma ray by the filter.

While the fluorescence of the Ba in the $BaSO_4$ reflective paint excited by the high-energy I-123 gamma ray adds an undesirable background in the tellurium K-shell region, it can be eliminated through the use of $Al(OH)_3$ reflecting paint.

A more significant problem are the Compton electrons in this same energy region generated by interactions of the 159 keV gamma ray within the $CaF_2(EU)$ crystal. While this background can be estimated (and subtracted) by separately measuring the counting rate in the flat spectral energy region at 50 keV, it will also lower the statistical significance of the tellurium x-ray signals.

The solution to this problem is to increase the density and atomic number of the material used in the collimators to reduce the penetration of the collimator by the 159 keV gamma ray and provide additional shielding around the crystals. Also, making the $CaF_2(Eu)$ crystal thinner will help reduce the Compton interactions in the crystal while still maintaining a high efficiency for x-rays. Crystals made from other materials may help. Of course, none of this is a problem for I-125.

Since the data is normalized to 100 µCi of I-123 contained in 20 mm of the capillary tube, the activity per millimeter is 5 µCi. The disintegration rate per millimeter is therefore $185 \times 10^3$ dps/mm ($5 \times 3.7 \times 10^4$).

The x-ray photons per millimeter of the source are then $161 \times 10^3$ (87% of disintegrations) and the total 159 keV photons from the source are $3.07 \times 10^6$ (83% of disintegrations).

The distance between the capillary tube and crystal is about 6.6 cm so the fractional area subtended by the crystal is $2.7^2$ divided by $4\pi(6.6^2)$ or 1.332%. Taking the ratio of collimator hole area to total area at 56.3%, the x-ray flux to the crystal from 1 mm of the source at the collimator focus is expected to be 1,385 photons per second. The actual number from the curves shown in FIGS. 23, 24 is about 78. This puts the collimator efficiency at about 5.6%.

This result could be too small to the extent that the focal point of the collimator is not exactly centered on the capillary tube and/or the geometric size of the focus is less than a millimeter.

Figure 25:
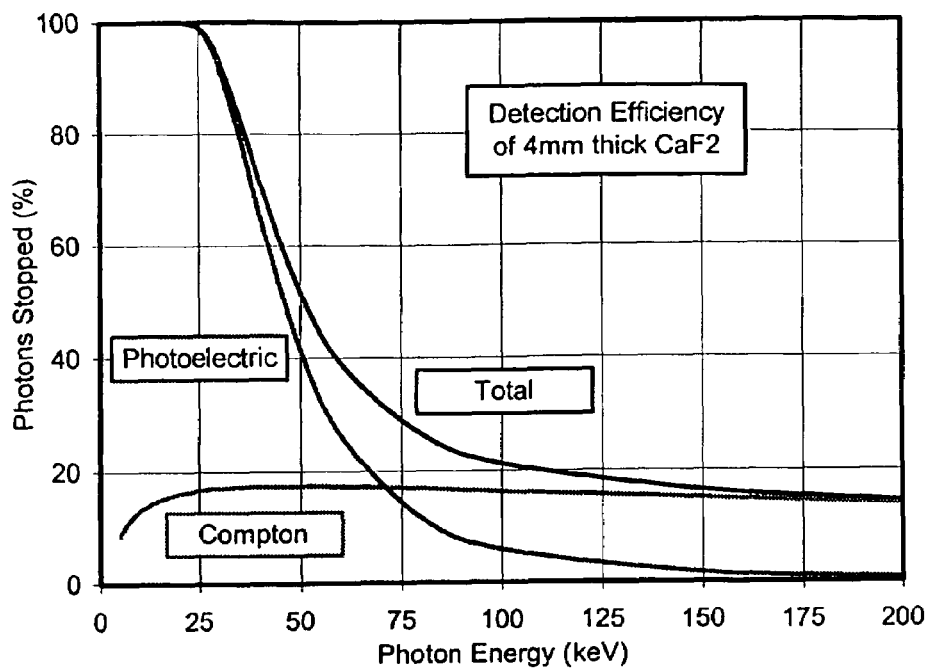
FIG. 25 shows the detection efficiency of 4 mm CaF2 crystal.

Since the fractional area of the crystal is 1.332%, the totalflux from 159 keV photons in the crystal is expected to be about $40.9 \times 10^3$ per second. The area under the $Al(OH)_3$ curve is 1,365 per second. Assuming a natural background of ~100 per second and correcting for the beryllium copper transmission 18.7% and 16.2% efficiency for stopping 159 keV photons by the $CaF_2$ crystal, this comes to $41.8 \times 10^3$ per second. FIG. 25 shows the stopping power of the 4 mm $CaF_2$ crystal as a function of energy.

This undesirable background can be removed by replacing some of the BeCu plates with other material. For example, if we replace every fifth BeCu plate with an identical one made of tungsten, there will be about 0.5 cm of tungsten altogether in the collimator. This is enough to reduce the background from the 159 keV I-123 gamma ray to less than 1%.

Figure 26:
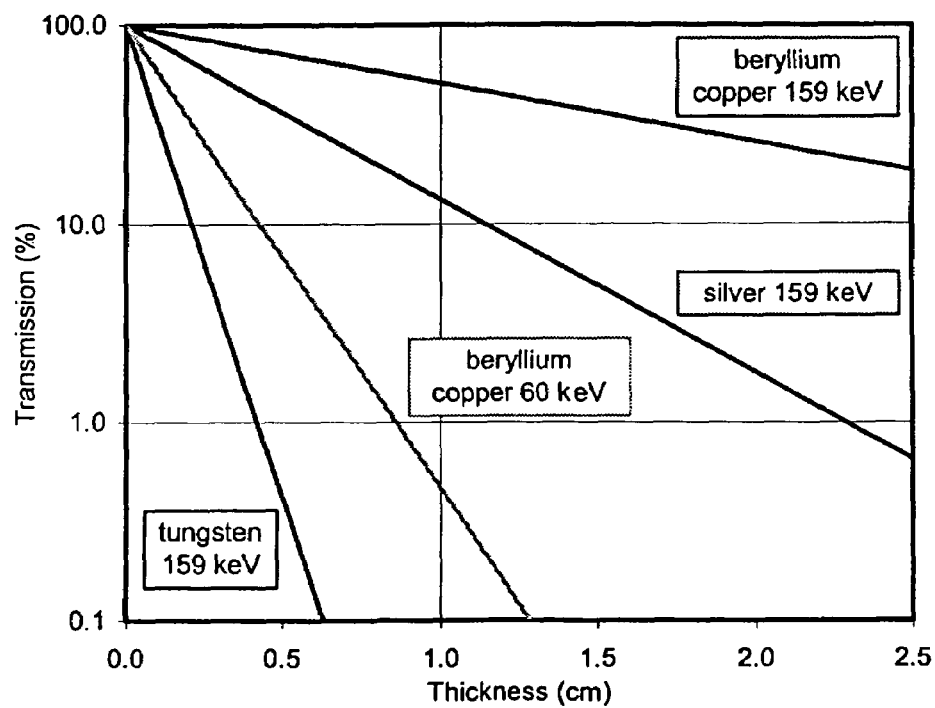
FIG. 26 shows the transmission efficiency of several different plate materials at 159 and 60 keV.

To avoid the tungsten K-shell x-rays at 60 keV from getting to the $CaF_2$ crystals the tungsten plates can be concentrated in the center of the collimator stack. A "sandwich" with 1 cm of BeCu plates at the top and bottom with 0.5 cm in the middle would provide enough copper between the tungsten and the detector to absorb fluorescence from the tungsten. FIG. 26 shows the transmission of several plate materials at 159 and 60 keV.

In summary, substituting $Al(OH)_3$-based paint for the standard $BaSO_4$ paint gets rid of the interfering fluorescence from Ba.

These first results with I-123 show a substantial penetration of the collimator made with stacked beryllium-copper plates. This can be remedied by substituting a small number of plates fabricated from tungsten or similar high-density, high atomic number material distributed in some optimal pattern.

Since certain changes may be made in the above described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. An apparatus for conducting high resolution imaging of radioactive emissions from a desired source, the apparatus comprising:
    a collimator comprised of a plurality of stacked plates, each plate having a plurality of holes through each plate defining a plurality of passages through the collimator permitting the passage of radiation therethrough;
    a scintillation crystal permitting the detection of photons coming from the source and passing through the collimator to produce light received by a light pulse sensor;
    a data processor connected to the light pulse sensor for digitally computing the count of photons and visually constructing a digital image on a display device of the relative location of the emitted radiation;
    an optical integrating cavity for directing the photons emitted by the scintillation crystal to the light pulse sensor; and
    wherein the plurality of stacked plates comprises certain plates made from a different material than a remainder of the stacked plates.

2. The apparatus for conducting high resolution imaging of radioactive emissions from a desired source as set forth in claim 1 wherein the optical integrating cavity comprises a reflective, semi-hemispherical intermediate surface for directing the photons emitted from the scintillation crystal towards the light pulse sensor.

3. The apparatus for conducting high resolution imaging as set forth in claim 1 further comprising the about ten-thousand holes in each plate.

4. The apparatus for conducting high resolution imaging as set forth in claim 1 further comprising chemically etched holes in a size ranging from about 565 microns on a top plate to about 206 microns in a bottom plate of the collimator.

5. The apparatus for conducting high resolution imaging as set forth in claim 4 further comprising the plates being about 101 microns thick.

* * * * *